US009619314B2

(12) United States Patent
Nagura et al.

(10) Patent No.: US 9,619,314 B2
(45) Date of Patent: Apr. 11, 2017

(54) MANAGEMENT SYSTEM AND MANAGEMENT PROGRAM

(71) Applicant: HITACHI, LTD., Tokyo (JP)

(72) Inventors: Masataka Nagura, Tokyo (JP); Jun Nakajima, Tokyo (JP); Takayuki Nagai, Tokyo (JP); Yutaka Kudo, Tokyo (JP)

(73) Assignee: HITACHI, LTD., Tokyo (JP)

( * ) Notice: Subject to any disclaimer, the term of this patent is extended or adjusted under 35 U.S.C. 154(b) by 55 days.

(21) Appl. No.: 14/427,958

(22) PCT Filed: Apr. 5, 2013

(86) PCT No.: PCT/JP2013/060506
§ 371 (c)(1),
(2) Date: Mar. 12, 2015

(87) PCT Pub. No.: WO2014/162595
PCT Pub. Date: Oct. 9, 2014

(65) Prior Publication Data
US 2016/0004582 A1 Jan. 7, 2016

(51) Int. Cl.
*G06F 11/07* (2006.01)
*G06F 11/30* (2006.01)
(Continued)

(52) U.S. Cl.
CPC ........ *G06F 11/079* (2013.01); *G06F 11/0709* (2013.01); *G06F 11/0721* (2013.01);
(Continued)

(58) Field of Classification Search
CPC ............... G06F 11/079; G06F 11/0709; G06F 11/0727; G06F 11/0793; G06F 11/3051;
(Continued)

(56) References Cited

U.S. PATENT DOCUMENTS 6,108,748 A 8/2000 Ofek et al.
6,487,677 B1 * 11/2002 Jantz .................. G06F 11/0748 714/2

(Continued)

FOREIGN PATENT DOCUMENTS

| | | |
|---|---|---|
| JP | H02-096201 A | 4/1990 |
| JP | 201086115 A | 4/2010 |
| WO | 2011007394 A1 | 1/2011 |

OTHER PUBLICATIONS

Takayuki Nagai et al.; Design of Fault Recovery Planning System for IT Systems: The Institute of Electronics, Information and Communication Engineers, Mar. 7, 2013, vol. 112 No. 492, pp. 125-130.

(Continued)

*Primary Examiner* — Nadeem Iqbal
(74) *Attorney, Agent, or Firm* — Volpe and Koenig, P.C.

(57) ABSTRACT

A management system manages a plurality of management target devices. A storage device stores one or more rules, plan information, and plan history information. A control device specifies a first cause event that is a candidate of a cause of the event that has occurred in any one of the management target devices based on the one or more rules, specifies a plurality of first plans that can be executed in the case in which the first cause event is a cause based on the plan information, calculates an index value indicating a possibility of succeeding in a failure recovery in the case in which the plan is executed for each of the plurality of first plans based on the plan history information, and displays data indicating any one or more plans of the plurality of first plans according to a display mode decided based on the index value.

10 Claims, 28 Drawing Sheets

(51) Int. Cl.
*G06F 11/34* (2006.01)
*H04L 12/24* (2006.01)
*G06F 11/20* (2006.01)

(52) U.S. Cl.
CPC ...... *G06F 11/0769* (2013.01); *G06F 11/0793* (2013.01); *G06F 11/30* (2013.01); *G06F 11/34* (2013.01); *G06F 11/3419* (2013.01); *G06F 11/3466* (2013.01); *H04L 41/0663* (2013.01); *G06F 11/2094* (2013.01); *G06F 11/3031* (2013.01); *G06F 2201/81* (2013.01); *G06F 2201/86* (2013.01)

(58) Field of Classification Search
CPC ............. G06F 11/0748; G06F 11/0751; G06F 11/1484; G06F 11/2257; G06F 11/0715; G06F 11/30; G06F 11/3006; G06F 11/3409; G06F 11/3024; G06F 11/1479
See application file for complete search history.

(56) References Cited

U.S. PATENT DOCUMENTS 7,107,185 B1 9/2006 Yemini et al.
7,536,370 B2 * 5/2009 Masurkar ............ G06F 11/0709 706/45
7,734,945 B1 6/2010 Levidow et al.
8,863,154 B2 * 10/2014 Mikami ................ G06F 11/327 719/318
2005/0137832 A1 * 6/2005 Yemini ............... G06F 11/2257 702/183
2006/0242288 A1 * 10/2006 Masurkar ............ G06F 11/0709 709/223
2010/0223499 A1 * 9/2010 Panigrahy ........... G06F 11/0709 714/19
2011/0264956 A1 * 10/2011 Ito ....................... G06F 11/0748 714/20
2011/0302305 A1 12/2011 Morimura et al.
2014/0068343 A1 * 3/2014 Nakajima ........... G06F 11/3051 714/39
2015/0370619 A1 * 12/2015 Nagura ................... G06F 11/30 719/318

OTHER PUBLICATIONS

Japanese Office Action issued Sep. 20, 2016. Japanese Application No. 2015-509840. Partial English Translation is included.

* cited by examiner

Fig. 5

Apparatus performance management table 33110 33120 33130 33140 33150 33160 33170 33180

| Appara-tus ID | Device ID | Metric | Apparatus OS | Performan-ce value | Alert execution threshold value | Thres-hold value type | Status |
|---|---|---|---|---|---|---|---|
| SYS1 | CTL1 | Operation rate | - | 40(%) | 20(%) | Upper limit | Threshold value abnormality |
| SYS1 | CTL2 | Operation rate | - | 60(%) | 80(%) | Upper limit | Normal |
| SYS1 | LU1 | I/O amount per unit time | - | 300(IOPS) | 1000 (IOPS) | Upper limit | Normal |
| SYS1 | LU2 | I/O amount per unit time | - | 400(IOPS) | 1000 (IOPS) | Upper limit | Normal |
| HOST1 | /var | Response time | Linux | 5(msec) | 10(msec) | Upper limit | Normal |
| HOST1 | /opt | Response time | Linux | 5(msec) | 10(msec) | Upper limit | Normal |
| HOST2 | E: | Response time | Windows | 5(msec) | 10(msec) | Upper limit | Normal |
| HOST3 | E: | Response time | Windows | 15(msec) | 10(msec) | Upper limit | Normal |
| : | : | : | : | : | : | : | : |

Volume topology management table

33200

| Apparat-us ID (33210) | Volume ID (33220) | LU number (33230) | Controller name (33240) | Connection destination host ID (33250) | Connection destination drive name (33260) |
|---|---|---|---|---|---|
| SYS1 | VOL1 | LU1 | CTL1 | HOST1 | /var |
| | VOL1 | LU1 | CTL2 | HOST1 | /opt |
| | VOL2 | LU2 | CTL3 | HOST2 | E: |
| | VOL5 | LU3 | CTL4 | HOST3 | E: |
| : | : | : | : | : | : |

Fig. 7

Event management table 33310 33320 33330 33340 33350 33360 33370 33380

| Event ID | Apparatus ID | Apparatus region ID | Metric | Apparatus OS | Status | Analyzed flag | Occurrence date and time |
|---|---|---|---|---|---|---|---|
| EV1 | SYS1 | CTL1 | Operation rate | - | Threshold value abnormality | No | 2010-01-01 15:05:00 |
| EV2 | SYS1 | CTL3 | Operation rate | - | Threshold value abnormality | No | 2010-01-01 15:00:00 |
| EV3 | SYS1 | LU1 | I/O amount in a unit time | - | Threshold value abnormality | No | 2010-01-01 15:05:00 |
| EV4 | SYS1 | LU2 | I/O amount in a unit time | - | Threshold value abnormality | No | 2010-01-01 15:00:00 |
| EV5 | SYS1 | LU3 | I/O amount in a unit time | - | Threshold value abnormality | No | 2010-01-01 15:05:00 |
| EV6 | HOST1 | /var | Response time | Linux | Threshold value abnormality | No | 2010-01-01 15:05:00 |
| EV7 | HOST1 | /opt | Response time | Linux | Threshold value abnormality | No | 2010-01-01 15:05:00 |
| EV8 | HOST2 | E: | Response time | Windows | Threshold value abnormality | No | 2010-01-01 15:00:00 |
| EV9 | HOST3 | E: | Response time | Windows | Threshold value abnormality | No | 2010-01-01 15:05:00 |
| : | : | : | : | : | : | : | : |

General rule

33450

| | | | Apparatus type | Apparatus region type | Metric | Status |
|---|---|---|---|---|---|---|
| 33410 | Condition part | 1 | Host computer | Drive | Response time | Threshold value abnormality |
| | | 2 | Storage apparatus | LU | I/O amount in a unit time | Threshold value abnormality |
| 33420 | Conclusion part | | Storage apparatus | LU | I/O amount in a unit time | Bottleneck |
| 33430 | General rule ID | | Rule1 | | | |
| 33440 | Application topology | | Volume topology management table | | | |

Fig. 9A

Expansion rule

33550

| | | | Apparatus ID | Apparatus region ID | Metric | Status |
|---|---|---|---|---|---|---|
| 33510 | Condition part | 1 | HOST1 | /var | Response time | Threshold value abnormality |
| | | 2 | SYS1 | LU1 | I/O amount in a unit time | Threshold value abnormality |
| 33520 | Conclusion part | | SYS1 | LU1 | I/O amount in a unit time | Bottleneck |
| 33530 | Expansion rule ID | | ExRule1-1 | | | |
| 33540 | Pre-expansion general rule ID | | Rule-1 | | | |

Fig. 9B

Expansion rule

33550

| | | | Apparatus ID | Apparatus region ID | Metric | Status |
|---|---|---|---|---|---|---|
| 33510 | Condition part | 1 | HOST1 | /opt | Response time | Threshold value abnormality |
| | | 2 | SYS1 | LU1 | I/O amount in a unit time | Threshold value abnormality |
| 33520 | Conclusion part | | SYS1 | LU1 | I/O amount in a unit time | Bottleneck |
| 33530 | Expansion rule ID | | ExRule1-2 | | | |
| 33540 | Pre-expansion general rule ID | | Rule-1 | | | |

Fig. 9C

Expansion rule

33550

| | | | Apparatus ID | Apparatus region ID | Metric | Status |
|---|---|---|---|---|---|---|
| 33510 | Condition part | 1 | HOST2 | E: | Response time | Threshold value abnormality |
| | | 2 | SYS1 | LU2 | I/O amount in a unit time | Threshold value abnormality |
| 33520 | Conclusion part | | SYS1 | LU2 | I/O amount in a unit time | Bottleneck |
| 33530 | Expansion rule ID | | ExRule1-3 | | | |
| 33540 | Pre-expansion general rule ID | | Rule-1 | | | |

Fig. 9D

Expansion rule

33550

| | | | Apparatus ID | Apparatus region ID | Metric | Status |
|---|---|---|---|---|---|---|
| 33510 | Condition part | 1 | HOST3 | E: | Response time | Threshold value abnormality |
| | | 2 | SYS1 | LU3 | I/O amount in a unit time | Threshold value abnormality |
| 33520 | Conclusion part | | SYS1 | LU3 | I/O amount in a unit time | Bottleneck |
| 33530 | Expansion rule ID | | ExRule1-4 | | | |
| 33540 | Pre-expansion general rule ID | | Rule-1 | | | |

Fig. 10

Analysis result management table 33610 33620 33630 33640 33650 33660 33670 33680

| Cause apparatus ID | Cause region ID | Metric | Certainty factor | Expansion rule ID | Reception event ID | Corresponded flag | Analysis execution date and time |
|---|---|---|---|---|---|---|---|
| SYS1 | LU1 | I/O amount in a unit time | 2/2 | ExRule1-1 | EV3<br>EV6 | No | 2010-01-01 15:05:00 |
| SYS1 | LU1 | I/O amount in a unit time | 2/2 | ExRule1-2 | EV3<br>EV7 | No | 2010-01-01 15:05:00 |
| SYS1 | LU2 | I/O amount in a unit time | 2/2 | ExRule1-3 | EV4<br>EV8 | No | 2010-01-01 15:00:00 |
| SYS1 | LU3 | I/O amount in a unit time | 2/2 | ExRule1-4 | EV5<br>EV9 | No | 2010-01-01 15:05:00 |
| : | : | : | : | : | : | : | : |

General plan table 33710 33720

| General plan ID | Plan |
|---|---|
| Plan1 | Volume Migration |
| Plan2 | Tiering Policy modification |
| Plan3 | Host reboot |
| Plan4 | Band modification of a storage port |
| Plan5 | Disk addition to pool |
| Plan6 | VM migration |
| Plan7 | Configuration modification of a switch port |
| Plan8 | Exchange of a switch port |
| Plan9 | Switch exchange |
| Plan10 | Storage vMotion migration |
| Plan11 | Volume Migration between enclosures |
| … | … |

Expansion plan table

| 33810 | 33830 Expans-ion plan ID | 33840 Plan target | | | | | | 33890 Risk point |
|---|---|---|---|---|---|---|---|---|
| | | 33850 Migration target volume | | 33860 Migration source apparatus | | 33870 Migration destination apparatus | | |
| | | 33850A Volume ID | 33850B I/O Response Time predictio-n | 33860A Appara-tus ID | 33860B I/O Response Time predictio n | 33870A Appara-tus ID | 33870B I/O Response Time prediction | |
| Plan detail | ExPlan 1-1 | LU2 | 2.5 (msec) | SYS1 | 3 (msec) | SYS2 | 2.5 (msec) | - |
| | ExPlan 1-2 | LU2 | 4 (msec) | SYS1 | 3 (msec) | SYS2 | 2 (msec) | - |
| | ExPlan 1-3 | LU2 | 3 (msec) | SYS1 | 3 (msec) | SYS2 | 3 (msec) | - |
| 33820 Gener-al plan ID | Plan1 | | | | | | | |
| 33823 Expansi-on rule ID | ExRule1-1 | | | | | | | |
| 33825 General rule ID | Rule1 | | | | | | | |

Rule plan correspondence management table 33910 33920 33930

| General rule ID | General plan ID | Unsolved event ID |
|---|---|---|
| Rule1 | Plan1 | NONE |
| | Plan5 | 3 |
| Rule2 | Plan2 | ALL |
| | Plan3 | 1, 3, 4 |

Plan execution history management table 33960 33970 33980 33990

| Expansion rule ID | Expansion plan ID | Executio-n success or failure | Execution date and time |
|---|---|---|---|
| ExRule1-1 | ExPlan1-1 | OK | 2010-1-3 18:00:00 |
| | ExPlan1-1 | NG | 2010-1-2 08:00:00 |
| ExRule2-1 | ExPlan2-1 | OK | 2010-1-5 18:00:00 |
| | ExPlan3-1 | OK | 2010-1-2 18:00:00 |

Measure plan list

71010

| Failure cause | | | Certainty factor | Plan that is a candidate | | Cost ($) | Down time | Risk point |
|---|---|---|---|---|---|---|---|---|
| Appar-atus | Appar-atus region | Cause | | # | | | | |
| Storage A | POOL 1 | Respon-se time down | ☆☆☆ | 1 | VolumeMigration Target: LU2 SYS1→SYS2 | $10 | 3hr | - |
| | | | | 2 | VolumeMigration Target: LU2 SYS1→SYS3 | $10 | 4hr | - |
| | | | | 3 | VolumeMigration Target: LU2 SYS1→SYS4 | $10 | 4hr | - |
| … | … | … | … | 4 | … | … | … | … |
| | | | | 5 | … | … | … | … |

Plan execution

Test case repository 34110 34120 34130

| Failure event information | | | | | Expansi-on rule ID | Expansion plan ID |
|---|---|---|---|---|---|---|
| Appara-tus ID | Apparatus region ID | Metric | Apparatus OS | Status | | |
| SYS1 | CTL1 | Operation rate | - | Threshold value abnormali-ty | ExRule 1-1 | ExPlan 1-1 |
| SYS1 | CTL3 | Operation rate | - | Threshold value abnormali-ty | | ExPlan 1-1 |
| SYS1 | LU1 | I/O amount in a unit time | - | Threshold value abnormali-ty | ExRule 2-1 | ExPlan 2-1 |
| SYS1 | LU2 | I/O amount in a unit time | - | Threshold value abnormali-ty | | ExPlan 3-1 |
| SYS1 | LU3 | I/O amount in a unit time | - | Threshold value abnormali-ty | | |

Plan execution history management table 33960 33970 33980 33990 33995 33997

| Expansion rule ID | Expansion plan ID | Executi-on success or failure | Execution date and time | External reception | Transmi-ssion source server |
|---|---|---|---|---|---|
| ExRule1-1 | ExPlan1-1 | OK | 2010-1-3 18:00:00 | | |
| | ExPlan1-1 | NG | 2010-1-2 08:00:00 | | |
| ExRule2-1 | ExPlan2-1 | OK | 2010-1-5 18:00:00 | Yes | #2 |
| | ExPlan3-1 | OK | 2010-1-2 18:00:00 | | |

Management server list 34210 34220

| Server ID | IP address |
|---|---|
| #1 | 192.168.1.10 |
| #2 | 192.168.3.20 |
| #3 | 192.168.5.60 |
| #4 | 192.168.12.30 |

Figure 30:
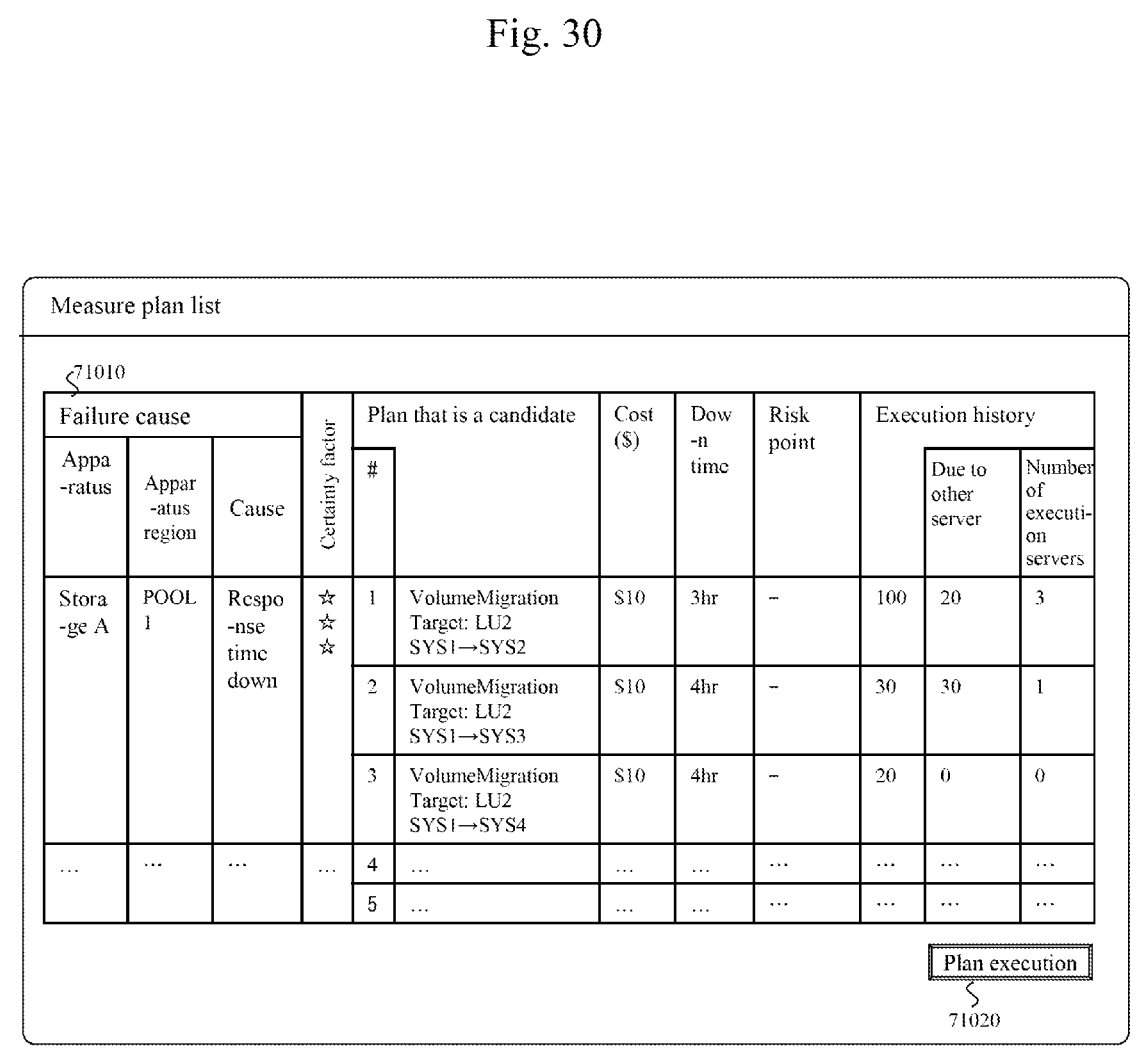

Measure plan list

71010

| Failure cause | | | Certainty factor | Plan that is a candidate | | Cost ($) | Dow -n time | Risk point | Execution history | | |
|---|---|---|---|---|---|---|---|---|---|---|---|
| Appa -ratus | Appar -atus region | Cause | | # | | | | | | Due to other server | Number of executi- on servers |
| Stora -ge A | POOL 1 | Respo -nse time down | ☆☆☆ | 1 | VolumeMigration Target: LU2 SYS1→SYS2 | $10 | 3hr | – | 100 | 20 | 3 |
| | | | | 2 | VolumeMigration Target: LU2 SYS1→SYS3 | $10 | 4hr | – | 30 | 30 | 1 |
| | | | | 3 | VolumeMigration Target: LU2 SYS1→SYS4 | $10 | 4hr | – | 20 | 0 | 0 |
| ... | ... | ... | ... | 4 | ... | ... | ... | ... | ... | ... | ... |
| | | | | 5 | ... | ... | ... | ... | ... | ... | ... |

Plan execution

71020

MANAGEMENT SYSTEM AND MANAGEMENT PROGRAM

TECHNICAL FIELD

The present invention relates to a technique for managing a computer system including management target apparatuses such as a host computer, a network apparatus, and a storage apparatus for instance.

BACKGROUND ART

For a management of a computer system, by utilizing a technique for specifying a failure cause on an event base such as an Event Correlation technique, a manager of a computer system can detect a cause of a failure that has occurred in the computer system (see Patent Literature 1).

For instance, Patent Literature 2 discloses a technique where an analysis engine for analyzing a cause-and-effect relationship of an event such as a plurality of failures that have occurred in management target apparatuses applies a general rule composed of a condition statement and a conclusion statement that have been defined in advance to an event related to a management target apparatus, for instance an event in which a performance value exceeds a predetermined threshold value, an expansion rule including a cause event that is a cause of a performance degradation and a condition event group caused by the cause event is created and a cause of a failure is specified based on the expansion rule that has been created.

A recent computer system involves a lot of useful measures that can be executed as a recovery measure to a failure (a measure to implement a restoration from a failure, that is, a failure recovery), such as a measure to implement a restoration from a failure by executing a suitable data migration for a placement of a system resource (such as a virtual machine and data). As a technique for executing a data migration for instance, in an environment in which a plurality of virtual host computers (that are virtual machines, hereafter referred to as VM) are operated on a physical host computer, a technique for taking over an operation of a VM from a certain physical host computer to another physical host computer (a first VM migration) and a technique for migrating a VM that has been stored into a certain storage area to another storage area (a second VM migration) in accordance with information indicating a performance of a VM and use information of a resource are known. Here, the VM is a kind of data that is stored into a storage area, and the VM migration (a first VM migration and a second VM migration) is a kind of data migration between storage areas. Moreover, as a technique for executing a data migration between data storage areas (volumes) of a storage apparatus, a volume migration is known (see Patent Literature 3).

Non Patent Literature 1 discloses a technique for checking whether or not a failure has been improved by a recovery measure after the recovery measure to a failure is executed and for automatically executing another recovery measure that has been defined in advance in the case in which a failure has not been improved.

Patent Literature 4 discloses a technique for recording details of a recovery measure that was executed to a failure and for utilizing the recorded information in the case in which a recovery measure is selected.

CITATION LIST

Patent Literature

[PTL 1]
U.S. Pat. No. 7,107,185
[PTL 2]
Japanese Patent Application Laid-Open Publication No. 2010-86115
[PTL 3]
U.S. Pat. No. 6,108,748
[PTL 4]
International Publication No. 2011/007394 pamphlet
[Non Patent Literature]
[NPL 1]
"A Policy Description and its Execution Scheduling for Automated IT Systems Management" (Yutaka Kudo, Tomohiro Morimura, Yoshimasa Masuoka, and Norihisa Komoda), the C Society transactions of the Institute of Electrical Engineers of Japan, Vol. 131, No. 10, 2011

SUMMARY OF INVENTION

Technical Problem

In the case in which a failure that is specified by the Event Correlation technique that is disclosed in Patent Literature 1 or Patent Literature 2 is tackled, a manager does not know what kind of recovery measure is specifically executed for a failure recovery and a restoration from a failure is costly unfortunately. Even in the case in which a mapping of a failure cause and a recovery measure to the failure cause is taken and a recovery measure to the failure cause can be created based on the mapping, a manager does not know what kind of recovery measure is preferentially selected in order to execute a work along an intention of a manager who carries out a recovery work from a failure on an actual operational management site. In other words, in the case in which a failure cause and a recovery measure to the failure cause are presented to a manager, even in the case in which only recovery measure that is limited to some extent is selected due to an intention of a manager (such as a personal cost or an economical cost that is required for a failure recovery, and a priority judgment based on an importance of an apparatus that is a target of a recovery work), since a number of inferable recovery measures are presented to a manager, it is difficult for a manger to select a recovery measure.

In the case in which a technique that is disclosed in Non Patent Literature 1 is utilized, whether or not a failure has been improved by executing a selected recovery measure is checked and another recovery measure that has been defined in advance can be automatically executed in the case in which the failure has not been improved. By this technique, in the case in which a problem point remains after an execution of the recovery measure, another recovery measure can be further executed. However, since it is not considered what kind of recovery measure was executed by a manager in the case in which a similar failure, occurred in past times, a recovery measure that is not intended by a manager is preferentially presented or executed in some cases, whereby a cost may be increased in the case in which a manager selects a recovery measure.

Solution to Problem

A management system in accordance with the first aspect manages a computer system provided with a plurality of management target devices. A storage device of the management system stores one or more rules indicating a correspondence relationship between a cause event related to any one of the plurality of management target devices and one or more condition events related to any one of the plurality of management target devices that is a condition under which the cause event is a cause, plan information indicating a correspondence relationship between the rule and a plan that is a recovery measure that can be executed in the case in which a cause event of the rule is a cause, and plan history information indicating the success or failure of a failure recovery by an execution of the plan every when the plan is executed. A control device of the management system executes a cause analysis of an event that has occurred in any one of the plurality of management target devices and specifies a first cause event that is a candidate of a cause of the event that has occurred based on the one or more rules, specifies a plurality of first plans that can be executed in the case in which the first cause event is a cause based on the plan information, calculates an index value indicating a possibility of succeeding in a failure recovery in the case in which the plan is executed for each of the plurality of first plans based on the plan history information, and displays data indicating any one or more plans of the plurality of first plans according to a display mode decided based on the index value. "Displaying data" can mean that a management system displays data on a display device that is included in a management system or can mean that data to be displayed is transmitted to a remote computer that is coupled to a management system and that is provided with a display device.

Advantageous Effects of Invention

The present invention can provide a technique for supporting a manager who copes with a failure.

BRIEF DESCRIPTION OF DRAWINGS

FIG. 5 is a block diagram showing an example of an apparatus performance management table in accordance with the first embodiment.

FIG. 6 is a block diagram showing an example of a volume topology management table in accordance with the first embodiment.

FIG. 7 is a block diagram showing an example of an event management table in accordance with the first embodiment.

FIG. 8 is a block diagram showing an example of a general rule in accordance with the first embodiment.

FIG. 9A is a view showing a first example of an expansion rule in accordance with the first embodiment.

FIG. 9B is a view showing a second example of an expansion rule in accordance with the first embodiment.

FIG. 9C is a view showing a third example of an expansion rule in accordance with the first embodiment.

FIG. 9D is a view showing a fourth example of an expansion rule in accordance with the first embodiment, FIG. 10 is a block diagram showing an example of an analysis result management table in accordance with the first embodiment.

FIG. 11 is a block diagram showing an example of a general plan table in accordance with the first embodiment.

FIG. 12 is a block diagram showing an example of an expansion plan table in accordance with the first embodiment.

FIG. 13 is a block diagram showing an example of a rule plan correspondence management table in accordance with the first embodiment.

FIG. 14 is a block diagram showing an example of a plan execution history management table in accordance with the first embodiment.

FIG. 20 is a block diagram showing an example of a plan presentation screen in accordance with the first embodiment.

FIG. 23 is a block diagram showing an example of a test case repository in accordance with the second embodiment.

FIG. 27 is a block diagram showing an example of a plan execution history management table in accordance with the third embodiment.

FIG. 28 is a block diagram showing an example of a management server list in accordance with the third embodiment.

FIG. 30 is a block diagram showing an example of a plan presentation screen in accordance with the third embodiment.

DESCRIPTION OF EMBODIMENTS

Figure 1:
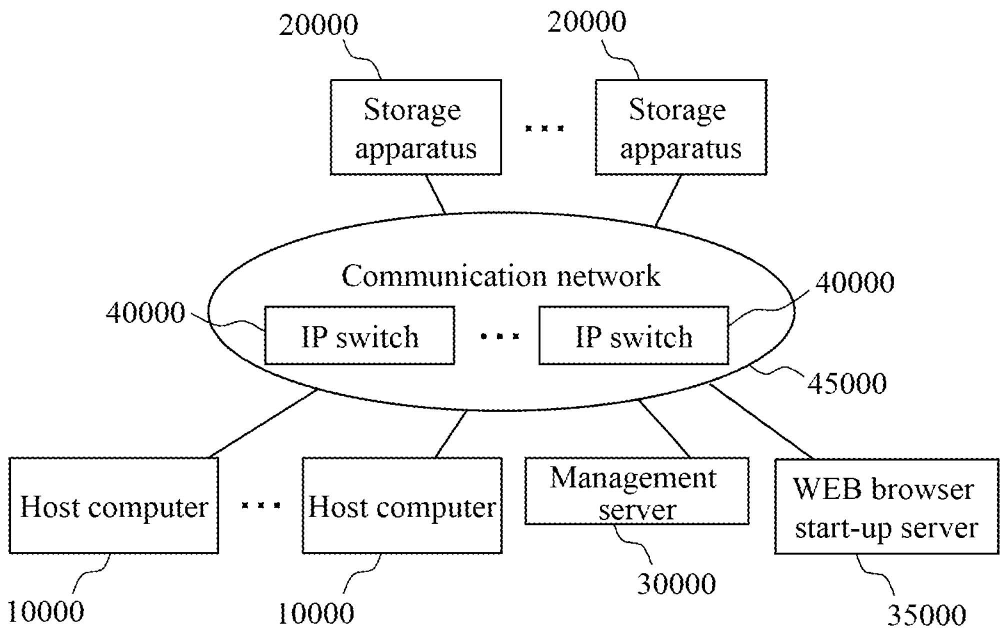
FIG. 1 is a block diagram showing an example of a computer system in accordance with a first embodiment.

The embodiments of the present invention will be described below with reference to the drawings. The embodiments that will be described in the following do not restrict the present invention in accordance with the claims, and all of elements and combinations thereof that will be described in the embodiment are not necessarily essential for means for solving the problems of the invention. In the drawings, the same reference symbols indicate the same composition elements through a plurality of drawings. In the following descriptions, while the information in accordance with the present invention will be described in the expression such as "aaa table", the information can also be represented by other than the data structure such as a table. In order to indicate that the information is not depended on a data structure, the expression of "aaa table" can also be referred to as "aaa information" or "aaa data" in some cases. Moreover, in the case in which the contents of the information are described, the expressions of "identification information", "identifier", "name", and "ID" are used. The expressions can be substituted for each other.

In the following descriptions, the descriptions will be done while a "program" or a "module" is handled as a subject in some cases. In the case in which the program (the module) is executed by a processor, the predetermined processing is executed while using a memory and a communication port (such as a management port and an I/O port). Consequently, a processor can also be handled as a subject in the descriptions. The processing that is disclosed while a program is handled as a subject can also be a processing that is executed by a computer or an information processing apparatus such as a management server. Moreover, a part or a whole of a program can also be implemented by dedicated hardware. A device including a processor or a processor and such dedicated hardware can also be referred to as a "control device". A variety of programs can be installed, to each of the computers by a program distribution server or a storage medium that can be read by a computer.

An aggregate of one or more computers that are configured to manage a computer system and to display the display information in accordance with the present invention is referred to as a management system in some cases. In the case in which a management server displays the display information, the management server is a management system. Moreover, a combination of the management server and a display computer (such as a WEB browser start-up server) is also a management system. A processing that is equivalent to the management server can also be implemented by using a plurality of computers to speed up a management processing and to increase reliability of a management processing. In this case, the plurality of computers is a management system (in the case in which a display is executed by the display computer, the display computer are included in the plurality of computers).

(I) First Embodiment

The first embodiment is related to a display processing of a candidate of a failure cause by management software (such as a program in a management server).

<System Configuration>

FIG. 1 is a block diagram showing an example of a computer system in accordance with a first embodiment.

A computer system is provided with one or more storage apparatuses 20000, one or more host computers 10000, a management server 30000, and a WEB browser start-up server 35000, which are coupled to each other by one or more network apparatuses, such as a communication network 35000 configured by an IP switch 40000 and a router not shown.

The host computer 10000 receives an I/O (input/output) request of a file from a client computer not shown and executes an access to the storage apparatus 20000 based on the received I/O request for instance. Moreover, the management server 30000 manages an operation of the entire computer system.

The WEB browser start-up server 35000 communicates with a GUI display processing module of the management server 30000 via the communication network 45000 and displays a variety of information on a browser screen that is displayed by the WEB browser. A manager refers to the information that is displayed on a browser screen of the WEB browser start-up server 35000 to manage each apparatus in the computer system. However, the management server 30000 and the WEB browser start-up server 35000 can also be configured by one server.

For apparatuses included in the computer system, an apparatus that is a target of a management of the management server 30000 is referred to as a management target apparatus in the following. In the present embodiment, a management target apparatus is the host computer 10000, the storage apparatus 20000, and a network apparatus such as the IP switch 40000. However, other apparatuses such as a NAS (Network Attached Storage) and a printer can also be included as a management target apparatus. Moreover, for devices included in the management target apparatus, a device that is a target of a management of the management server 30000 is referred to as a management target device.

<Internal Configuration of the Host Computer>

Figure 2:
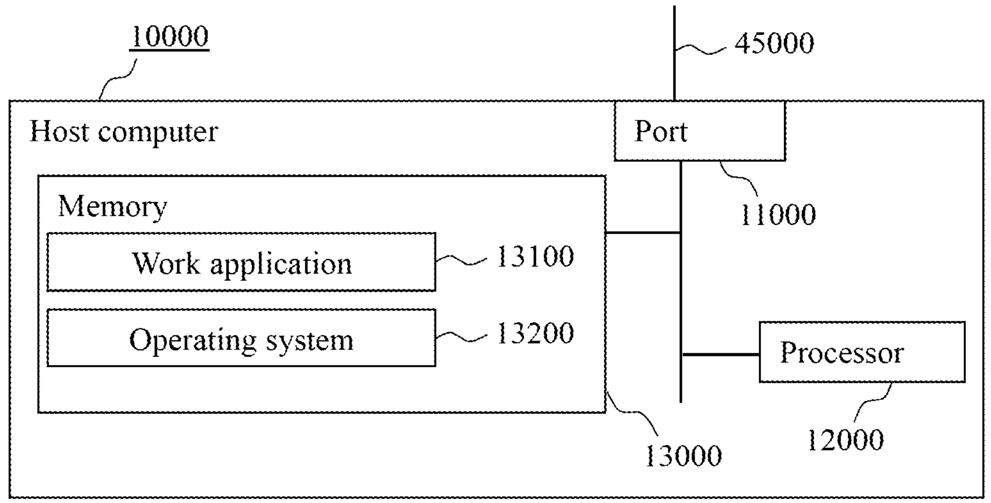
FIG. 2 is a block diagram showing an example of a host computer in accordance with the first embodiment.

FIG. 2 is a block diagram showing an example of a host computer in accordance with a first embodiment.

The host computer 10000 is provided with a port 11000 for being coupled to the communication network 45000, a processor 12000, and a memory 13000, which are coupled to each other via a circuit such as an internal bus. The host computer 10000 can also include a secondary storage device such as a disk to (a magnetic disk).

The memory 13000 stores a work application 13100 and an operating system (OS) 13200. The work application 13100 uses a storage area that has been provided from the operating system 13200 to execute an input/output (I/O) of data to the storage area. The operating system 13200 executes a processing for causing the work application 13100 to recognize a logical volume, on the storage apparatus 20000 coupled to the host computer 10000 via the communication network 45000 as a storage area.

In the example of FIG. 2, the port 11000 is referred to as a single port including an I/O port for executing a communication by the storage apparatus 20000 and an iSCSI (Internet Small Computer System Interface) and a management port for acquiring management information in the host computer 10000 by the management server 30000. However, the I/O port and the management port can also be separated as different ports.

<Internal Configuration of the Storage Apparatus>

Figure 3:
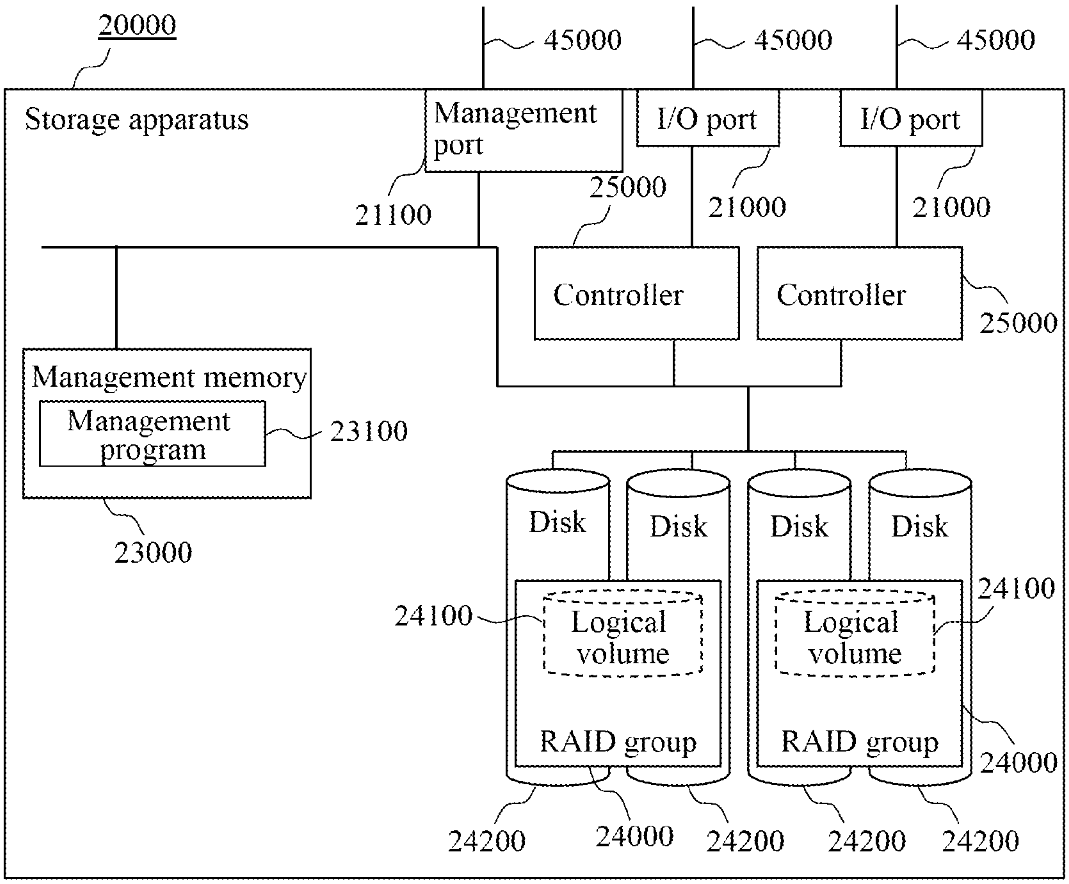
FIG. 3 is a block diagram showing an example of a storage apparatus in accordance with the first embodiment.

FIG. 3 is a block diagram showing an example of a storage apparatus in accordance with a first embodiment.

A storage apparatus 20000 is provided with an I/O port 21000 for being coupled to the host computer 10000 via, the communication network 45000, a management port 21100 for being coupled to the management server 30000 via the communication network 45000, a management memory 23000 for storing a variety of management information, a RAID (Redundant Arrays of Inexpensive Disks) group 24000 for storing user data, and a controller 25000 for controlling user data and management information in the management memory, which are coupled to each other via, a circuit such as an internal bus. In the present embodiment, that the RAID group 24000 is coupled to other device means that a disk 24200 that configures the RAID group 24000 is coupled to other device.

The management memory 23000 stores a management program 23100 for managing the storage apparatus 20000. The management program 23100 communicates with the management server 30000 via the management port 21100 and provides the configuration information of the storage apparatus 20000 to the management server 30000.

The RAID group 24000 is configured by one or more disks 24200. In the case in which the RAID group 24000 is configured by a plurality of disks 24200, the plurality of disks 24200 can make a RAID configuration. For the storage apparatus 20000, one or more logical volumes 24100 are formed based on a storage area in the RAID group 24000.

As long as the logical volume 24100 is configured by using a storage area of one or more disks 24200, it is not necessary to make a RAID configuration. Moreover, as a device that provides a storage area corresponded to the logical volume 24100, as substitute for the disk 24200, a storage medium of other kind such as a flash memory can also be adopted.

The controller 25000 is provided inside with a processor fir controlling the storage apparatus 20000 and a cache memory for temporarily storing data that is transmitted to and received from the host computer 10000. The controller 25000 is disposed between the I/O port 21000 and the RAID group 24000, and transmits and receives data between the I/O port 21000 and the RAID group 24000.

As long as the storage apparatus 20000 provides the logical volume 24100 to any host computer 10000, receives an I/O request, and is provided with a storage controller (the controller 25000 in the present embodiment) that executes a read and a write to a storage device (the disk 24200 in the present embodiment) according to the received I/O request and a storage device, that provides a storage area, a configuration other than that of FIG. 3 can also be adopted, for instance, a storage controller and a storage device that provides a storage area can also exist in separate enclosures, respectively. Although the management memory 23000 and the controller 25000 are configured as separate devices in an example of FIG. 3, a configuration in which the controller 25000 includes the management memory 23000 can also be adopted. Moreover, a "storage apparatus" can also be changed to be called a "storage system" as an expression in the both cases in which a storage controller and a storage device exist in the same enclosure and in which a storage controller and a storage device exist in separate enclosures.

<Internal Configuration of the Management Server>

Figure 4:
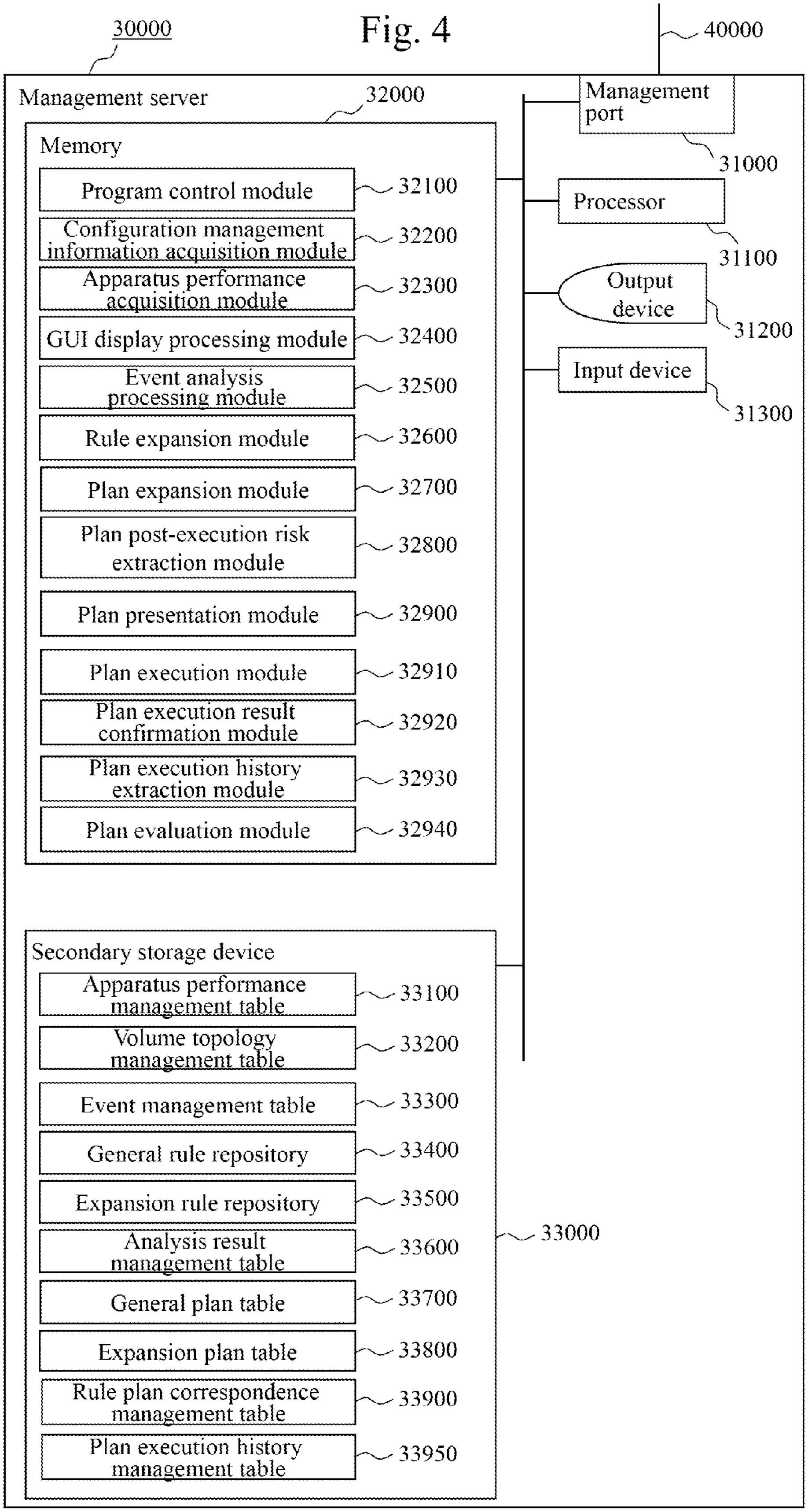
FIG. 4 is a block diagram showing an example of a management server in accordance with the first embodiment.

FIG. 4 is a block diagram showing an example of a management server in accordance with a first embodiment.

The management server 30000 is provided with a management port 31000 for being coupled to the communication network 45000, a processor 31100, a memory 32000 such as a cache memory that is one type of a storage device, a secondary storage device 33000 such as an HDD (hard disk drive) that is one type of a storage device, an output device 31200 such as a display for outputting a processing result, and an input device 31300 such as a keyboard for inputting an indication by a manager, which are coupled to each other via a circuit such as an internal bus.

The memory 32000 stores the computer programs of a program control module 32100, a configuration management information acquisition module 32200, an apparatus performance acquisition module 32300, a GUI display processing module 32400, an event analysis processing module 32500, a rule expansion module 32600, a plan expansion module 32700, a plan post-execution risk extraction module 32800, a plan presentation module 32900, a plan execution module 32910, a plan execution result confirmation module 32920, a plan execution history extraction module 32930, and a plan evaluation module 32940. In the present embodiment, each module is provided as a software module of the memory 32000. However, each module can also be provided as a hardware module. Moreover, a processing that is executed by each module can be provided as one or more program codes, it is not necessary that a clear boundary between modules exists. A module can also be called a program.

The secondary storage device 33000 stores an apparatus performance management table 33100, a volume topology management table 33200, an event management table 33300, a general rule repository 33400, an expansion rule repository 33500, an analysis result management table 38600, a general plan table 33700, one or more expansion plan tables 33800, a rule plan correspondence management table 33900, and a plan execution history management table 33950. The general rule repository 33400 stores one or more general rules. The expansion rule repository 33500 stores one or more expansion rules. The general rule and the expansion rule are information indicating a correspondence relationship between a combination of one or more condition events that may occur in a management target device that configures a computer system and a cause event that is a cause of a failure to the combination of one or more condition events. The secondary storage device 33000 is configured by a semiconductor memory and a disk, or any one of a semiconductor memory and a disk for instance.

The GUI display processing module 32400 displays the acquired configuration management information via the output device 31200 in response to a request via the input device 31300 from a manager. The input device 31300 and the output device 31200 can be separate devices, or can be one unified device.

The management server 30000 is provided with a keyboard or a pointer device as the input device 31300, and a display or a printer as the output device 31200 for instance. However, the management server 30000 can also be provided with other apparatuses. Moreover, it is also possible that a serial interface or Ethernet interface is used as substitute for an input/output device, a display computer provided with a display, a keyboard, or a pointer device is coupled to the interface, a display is executed with a display computer by transmitting the display information to the display computer and by receiving the input information from the display computer, and an input and an output of the input/output device are alternated by receiving an input.

<Configuration of the Apparatus Performance Management Table>

FIG. 5 is a block diagram showing an example of an apparatus performance management table in accordance with a first embodiment.

An apparatus performance management table 33100 includes an apparatus ID 33110 that is a field for storing an identifier of a management target apparatus (hereafter referred to as an apparatus ID), a device ID 33120 that is a field for storing an identifier of a management target device (hereafter referred to as a device ID), a metric 33130 that is a field for storing a metric name that indicates a kind of a performance value related to a management target device, an apparatus OS 33140 that is as field for storing data that indicates a type of an OS of a management target apparatus in which a threshold value abnormality of a performance value has been detected, a performance value 33150 that is a field for acquiring a performance value of a management target device from a management target apparatus including the device and for storing the performance value, an alert execution threshold value 33160 that is a field for storing a threshold value of an upper limit or a lower limit of a normal range a performance value of a management target device (hereafter referred to as an alert execution threshold value)

when an input is received from a user, a threshold value type 33170 that is a field for storing data that indicates whether the alert execution threshold value is an upper limit or a lower limit of a normal range, and status 33180 that is a field for storing data that indicates whether a performance value is a normal value or an abnormal value.

For instance, the first entry from above in FIG. 5 is an entry related to a controller CTL1 (that is a controller 25000 of which a device ID is CTL1, referred to as similarly in the case in which a management target device is specified using a device in a storage apparatus SYS1 (that is a storage apparatus 20000 of which an apparatus ID is SYS1, referred to as similarly in the case in which a management target apparatus is specified using an apparatus ID). From the entry, it is known that in the case in which an operation rate of a processor exceeds 20%, it is determined as an overload by the management server 30000 for the controller CTL1, that is, an alert execution threshold value for the controller CTL1 is 20%. Moreover from the entry, it is known that it is determined that an operation rate of a processor for the controller CTL1 is 40% at the present moment and the present performance value is an abnormal value In FIG. 5, as a performance value of a management target device, an operation rate of a processor (simply referred to as an operation rate in the figure), an I/O amount per unit time, and a response time are mentioned as an example. However, other kinds of a performance value can also be adopted.

<Configuration of a Volume Topology Management Table>

FIG. 6 is a block diagram showing an example of a volume topology management table in accordance with a first embodiment.

A volume topology management table 33200 is information (connection information) for managing a connection relationship among a plurality of management target devices in the computer system. The volume topology management, table 33200 includes an apparatus ID 33210 that is a field for storing an apparatus ID of the storage apparatus 20000, a volume ID 33220 that is a field for storing an identifier (hereafter referred to as a volume ID) that is used in the storage apparatus 20000, an LU number 33230 that is a field for storing an identifier (hereafter referred to as an LU number) of the logical volume 24100 for recognizing the logical volume 24100 by the host computer 10000, a controller name 32340 that is a field for storing a device ID of the controller 25000 that is used in the case in which the host computer 10000 accesses the logical volume 24100, a connection destination host ID 33250 that is a field for storing an apparatus ID of the host computer 10000 that, accesses the logical volume 24100, and a connection destination drive name 33260 that is a field for storing a device ID of a volume (a drive) in the host computer 10000 in which the logical volume 24100 is a substance.

For instance, from the first entry from above in FIG. 6, it is known that a logical volume VOL1 of a storage apparatus SYS1 is provided to a host computer HOST1 as a logical unit (LU) that is indicated, by an LU number of LU1, the host computer HOST1 accesses the logical volume VOL1 via a controller CTL1, and the logical volume VOL1 is recognized as a drive "/var" on the host computer HOST1. In the present embodiment, as a device ID of the logical volume 24100, there are two cases in which a volume ID is used and in which an LU number is used. For instance, the logical volume VOL1 is referred to as a logical volume LU1 in some cases. However, the logical volume VOL1 and the logical volume LU1 indicate the same logical volume 24100.

<Configuration of an Event Management Table>

FIG. 7 is a block diagram showing an example of an event management table in accordance with a first embodiment. An event management table 33300 is referred to from time to time in a failure cause analysis processing (FIG. 16) described later.

An event management table 33300 includes an event ID 33310 that is a field for storing an identifier imparted to an event of a failure or the like (hereafter referred to as an event ID), an apparatus ID 33320 that is a field for storing an apparatus ID of a management target apparatus in which an event has occurred, an apparatus region ID 33330 that is a field for storing a device ID of a management target device in which an event has occurred, a metric 33340 that is a field for storing a metric name related to a performance value of which a threshold value abnormality has been detected, an apparatus OS 33350 that is a field for storing data that indicates a type of an OS of a management target apparatus in which a threshold value abnormality has been detected, as status 33360 that is a field for storing data that indicates a state in an event occurrence for a management target device in which an event has occurred, an analyzed flag 33370 that is a field for storing data that indicates whether or not an event has already been analyzed by an event analysis processing module 32500, and an occurrence date and time 33380 that is a field for storing data that indicates the date and time when an event occurred.

For instance, from the first entry from above, in FIG. 7, it is known that, the management server 30000 detects a threshold value abnormality of an operation rate of a processor for the controller CTL1 of the storage apparatus SYS1 and an event ID of an event corresponded to the threshold value abnormality is "EV1".

<Configuration of a General Rule>

FIG. 8 is a block diagram showing an example of a general rule in accordance with a first embodiment.

A general rule is a rule indicating a correspondence relationship between a cause event related to any one of a plurality of management target devices and one or more condition events related to any one of as plurality of management target devices that are conditions in which a cause event is a cause of a failure and is a rule in which a management target device related to a cause event and a condition event is represented by a type of the management target device. In general, for an event propagation model for specifying a cause in a failure analysis, a combination of events predicted to occur due to a certain failure (cause) and the cause are described by the IF-THEN form. The general rule is not restricted to one mentioned in FIG. 8, and more rules can also be adopted.

A general rule includes a general rule ID 33430 that is a field for storing an identifier of a general rule (hereafter referred to as a general rule ID), a condition part 33410 that is a field for storing an observation event equivalent to an IF part of a general rule described by the IF-THEN form, that is, data indicating each of one or more condition events, a conclusion part 33420 that is a field for storing a cause event equivalent to a THEN part of a general rule described by the IF-THEN form, that is, data indicating a cause event, and an application topology 33440 that is a field for storing data indicating topology information (connection information) that is referred to in the case in which a general rule is expanded to a real system and an expansion rule is created. Moreover, the condition part 33410 includes a field 33450 for storing a number imparted to a condition event (hereafter referred to as a condition event number) for every condition event. In the case in which one or more condition events indicated by the condition part 33410 are detected, it is determined that a cause event, indicated by the conclusion part 33420 is a cause of a failure. In the case in which a status of the conclusion part 33420 becomes normal, it is expected that a problem of the condition part 33410 is also solved. In the example of FIG. 8, two condition events are described in the condition part 33410. However, the number of condition events is not restricted.

For instance, a general rule shown by an example of FIG. 8, that is, a general rule Rule1 (that is a general rule of which a general rule ID is Rule1, and described similarly in the case in which a rule is specified by using an identifier in the following) indicates that it is concluded that a threshold value abnormality of an I/O amount in a unit time for the logical volume 24100 of the storage apparatus 20000 is a cause in the case in which a threshold value abnormality of a response time for a drive of the host computer 10000 and a threshold value abnormality of an I/O amount in as unit time for the logical volume 24100 (LU) of the storage apparatus 20000 are detected as an observation event. In the case in which an expansion rule is created based on the general rule, the volume topology management table 33200 is referred to as the topology information. As a condition event included in the observation event, it can also be defined that a certain condition is normal.

<Configuration of an Expansion Rule>

FIG. 9A is a view showing a first example of an expansion rule in accordance with a first embodiment. FIG. 9B is a view showing a second example of an expansion rule in accordance with a first embodiment. FIG. 9C is a view showing a third example of an expansion rule in accordance with a first embodiment. FIG. 9D is a view showing a fourth example of an expansion rule in accordance with a first embodiment.

An expansion rule is a rule in which a general rule is expanded in a form depending on a real configuration of the computer system. In other words, the expansion rule is a rule indicating a correspondence relationship between a cause event related to any one of a plurality of management target devices and one or more condition events related to any one of a plurality of management target devices that are conditions in which a cause event is a cause of a failure and is a rule in which a management target device related to a cause event and a condition event is represented by data indicating the specific management target device. The expansion rule is created by replacing a type of a management target apparatus and a type of a management target device, related to each of a condition event and a cause event for a general rule by an apparatus ID of the specific management target apparatus and a device ID of the specific management target device that are defined by the volume topology management table 33200.

The configuration of an expansion rule will be described with reference to FIG. 9A in the following. An expansion rule includes an expansion rule ID 33530 that is a field for storing an identifier of an expansion rule (hereafter referred to as an expansion rule ID), an pre-expansion general rule ID 33540 that is a field for storing a general rule ID of a general rule that is a basis of an expansion rule, a condition part 33510 that is a field for storing an observation event equivalent to an IF part of an expansion rule described by the IF-THEN form, that is, data indicating each of one or more condition events, and a conclusion part 33520 that is a field for storing a cause event equivalent to a THEN part of an expansion rule described by the IF-THEN form, that is data indicating a cause event. Moreover, the condition part 33510 includes a field 33550 for storing a condition event number imparted to is condition event for every condition event.

For instance, an expansion rule shown by an example of FIG. 9A is created by replacing a type of a management target apparatus and a type of a management target device related to each of a condition event and a cause event for the general ruleRule1 shown in FIG. 8 by an apparatus ID of the specific management target apparatus (a host computer HOST1 and a storage apparatus SYS1) and a device ID of the specific management target device (a drive "/var" and a logical volume LU1) that are defined by the volume topology management table 33200. In FIG. 9A, in the case in which an expansion rule ExRule1-1 is expanded based on a general rule Rule1 and a threshold value abnormality of a response time for the drive "/var" of the host computer HOST1 and a threshold value abnormality of an I/O amount in a unit time for the logical volume LU1 of the storage apparatus SYS1 are detected as an observation event, it is known that it is concluded that a threshold value abnormality of an I/O amount in a unit time for the logical volume LU1 of the storage apparatus SYS1 is a cause.

<Configuration of an Analysis Result Management Table>

FIG. 10 is a block diagram showing an example of an analysis result management table in accordance with a first embodiment.

An analysis result management table 33600 includes a cause apparatus ID 33610 that is a field for storing an apparatus ID of a management target apparatus related to an event that has been determined as a candidate of a failure cause in a failure cause analysis processing (hereafter referred to as a cause candidate event) (a first cause event), a cause region ID 33620 that is a field, for storing a device ID of a management target device related to a cause candidate event, a metric 33630 that is a field for storing a metric name related to a performance value related to a cause candidate event, a certainty factor 33640 that is a field for storing a value (a certainty factor) indicating the certainty of the cause event being the root cause, an expansion rule 33650 that is a field for storing an expansion rule ID of an expansion rule including a cause candidate event as a cause event, that is, an expansion rule that is a reason of determining a cause candidate event as a candidate of a failure cause, a reception event ID 33660 that is a field for storing an event ID of an event that has actually occurred for one or more condition events of an expansion rule including a cause candidate event as a cause event, an corresponded flag 33670 that is a field for storing data that indicates whether or not a manager has actually executed a failure correspondence based on the analysis result, and an analysis execution date and time 33680 that is a field for storing data that indicates the date and time when a failure analysis processing associated with an occurrence of an event was started. In the present embodiment, a certainty factor is an occurrence rate of a condition event in the past certain period of time.

For instance, from the first entry from above in FIG. 10, it is known that the management server 30000 has determined that a threshold value abnormality of an I/O amount in a unit time for the logical volume LU1 of the storage apparatus SYS1 is a candidate of a failure cause, an occurrence of an event of which an event ID is indicated by "EV3" or "EV6" is a reason of the determination, and a certainty, that is, an occurrence rate of a condition event is 100% (2/2×100).

<Configuration of a General Plan>

FIG. 11 is a block diagram showing an example of a general plan table in accordance with a first embodiment.

A general than table 33700 is information indicating a list of a general plan. The general plan is a recovery measure to a failure that can be executed in the computer system (hereafter referred to as a plan), and is a plan represented in the form independent of an actual configuration of the computer system. The general plan table 33700 includes the fields of as general plan ID 33710 and a plan 33720. The general plan ID 33710 stores an identifier of a general plan (hereafter referred to as a general plan ID). The plan 33720 stores data that indicates a general plan that can be executed in the computer system, for instance, a name of a general plan. As a general plan, there can be mentioned for instance a reboot of the host computer 10000, a configuration modification of the IP switch 4000, and a volume migration and a VM migration of the storage apparatus 20000. The general plan is not restricted to one shown in FIG. 11.

<Configuration of an Expansion Plan>

FIG. 12 is a block diagram showing an example of an expansion plan table in accordance with a first embodiment.

An expansion plan table 33800 is information for managing one or more expansion plans. The expansion plan is a plan in which a general plan has been expanded in the form dependent of an actual configuration of the computer system. The expansion plan table 33800 is created based on an expansion rule, the general plan table 33700, the volume topology management table 33200, and the apparatus performance management table 33100 by the plan expansion module 32700.

The expansion plan table 33800 includes the fields of a plan detail 33810, a general plan ID 33820, an expansion rule ID 33823, and a general rule ID 33825. The general plan ID 33820 stores a general plan ID of a general plan that is a basis of an expansion plan. The expansion rule ID 33823 stores an expansion rule ID of an expansion rule corresponding to an expansion plan as information for recognizing a failure cause to which the expanded plan is corresponded. That is, each expansion plan in the expansion plan table 33800 is a plan that can be executed in the case in which a cause event, of an expansion rule that is indicated by an expansion rule ID of the expansion rule ID 33823 is a failure cause (a plan to the failure cause). In other words, the expansion plan table 33800 is information for managing a correspondence relationship between an expansion rule and one or more expansion plans that is corresponded to the expansion rule. In the present embodiment, the expansion plan table 33800 is created for every combination of an expansion rule and a general plan. However, the expansion plan table 33800 can also be created for every expansion rule, and other modes can also be adopted. The expansion plan table 33800 is corresponded to information (plan information) that indicates a correspondence relationship between a rule and a plan that can be executed in the case in which as cause event of the rule is a cause. The general rule. ID 33825 stores a general rule ID of a general rule that is a basis of an expansion rule corresponded to an expansion plan.

The plan detail 33810 stores the concrete processing contents about each of one or more expansion plans that have been expanded and the state information after the execution of the expansion plan. The plan detail 33810 includes the fields of an expansion plan ID 33830, a plan target 33840, and a risk point 33890. The expansion plan ID 33830 stores an identifier of an expansion plan (hereafter referred to as an expansion plan ID). The plan target 33840 stores information that indicates a composition element (device) related to an expansion plan and the information after the execution of the plan or the like. The risk point 33890 stores data that indicates a problem point that potentially remains after the execution of the plan (hereafter referred to as a risk point).

The expansion plan table 33800 shown by an example of FIG. 12 manages an expansion plan based on a general plan of which a general plan ID is Plan1, that is, an expansion plan related to a volume migration. In the case of the expansion plan related to a volume migration, the plan target 33840 includes the fields of a migration target volume 33850, a migration source apparatus 33860, and a migration destination apparatus 33870 for instance. The migration target volume 33850 includes a volume ID 33850A that is a field for storing a device ID of a logical volume 24100 that is a target of a volume migration (hereafter referred to as a migration target volume) and an I/O Response Time prediction 33850B that is a field for storing a predicted value of a response time of an I/O to a migration target volume after the execution of a volume migration. The migration source apparatus 33860 includes an apparatus ID 33860A that is a field for storing an apparatus ID of the storage apparatus 20000 that is provided with a migration target volume (hereafter referred to as a migration source apparatus) and an I/O Response Time prediction 33860B that is a field for storing a predicted value of a response time of an I/O to a migration source apparatus after the execution of a volume migration. The migration destination apparatus 33870 includes an apparatus ID 33870A that is a field for storing an apparatus ID of the storage apparatus 20000 that is a migration destination of data of a migration target volume (hereafter referred to as a migration destination apparatus) and an I/O Response Time prediction 33870B that is a field for staring a predicted value of a response time of an I/O to a migration destination apparatus after the execution of a volume migration.

For the information of the volume ID 33850A, the apparatus ID 33860A, and the apparatus ID33870A, the plan expansion module 32700 acquires the information from the volume topology management table 33200 and stores the information. As a calculation method of a value that is stared into each of the I/O Response Time prediction 33850B, I/O Response Time prediction 33860B, I/O Response Time prediction 33870B, an arbitrary method can also be adopted. For instance, a value of each of the I/O Response Time prediction 33850B, I/O Response Time prediction 33860B, I/O Response Time prediction 33870B can be a value to response time of an I/O) that is obtained by the plan expansion module 32700 that acquires an I/O amount in a unit time of a migration target volume, a migration source apparatus, and a migration destination apparatus from the apparatus performance management table 33100, subtracts a value of an I/O amount in a unit time of a migration target volume from an I/O amount in a unit time of a migration source apparatus, adds a value of an I/O amount in a unit time of a migration target volume to an I/O amount in a unit time of a migration destination apparatus, predicts an I/O amount of a migration source apparatus and a migration destination apparatus after the execution of a volume migration, and takes a reciprocal thereof. In an example of FIG. 12, an example in which the performance information is stored is described as the contents of the plan detail 33810. However, the cost information related to a plan and the down time information of a system due to a failure in the case in which a Plan is executed can also be stored for instance.

FIG. 12 shows an example of an expansion plan related to a volume migration. However, an expansion plan that is corresponded to other general plan that is included in the general plan table 33700 can also be created similarly. Even in the case in which other general plan is expanded to an expansion plan, the plan expansion module 32700 refers to the volume topology management table 33200, enumerates devices related to plan, refers to the apparatus performance management table 33100, simulates the state information after an execution of the plan such as the performance information, the capacity information, the cost information, and the down time information, and calculates a predicted value of a performance value after the execution of the plan for a device related to the plan.

<Configuration of a Rule Plan Correspondence Management Table>

FIG. 13 is a block diagram showing an example of a rule plan correspondence management table in accordance with a first embodiment.

A rule plan correspondence management table 33900 is information for managing a correspondence relationship between a general rule, and one or more general plans corresponded to the general rule, that is, one or more general plans that can be executed in the case in which a cause event of the general rule is a cause. The rule plan correspondence management table 33900 is corresponded to information (plan information) that indicates a correspondence relationship between a rule and a plan that can be executed in the case in which a cause event of the rule is a cause. The rule plan correspondence management table 33900 indicates a correspondence relationship among a general rule, a list of a general plan that can be executed in the case in which a cause of a failure is specified by applying the general rule, and an event remains in an unsolved state in the case in which each general plan is executed (hereafter referred to as an unsolved event).

The rule plan correspondence management table 33900 includes the fields of a general rule ID 33910, a general plan ID 33920, and an unsolved event ID 33930. The general rule ID 33910 stores a general rule ID of a general rule. The general plan ID 33920 stores a general plan ID of a general plan. The unsolved event ID 33930 stores an identifier of an event (an unsolved event) that remains in an unsolved state in the case in which each general plan is executed (hereafter referred to as an unsolved event ID). The unsolved event ID is corresponded to a condition event number that is stored into the field 33450 of the condition part 33410 of the general rule. For instance, the unsolved event ID 33930 stores "NONE" in the case in which an unsolved event does not exist, and stores "ALL" in the case in which all of condition events and cause events remain as an unsolved event.

<Configuration of a Plan Execution History Management Table>

FIG. 14 is a block diagram showing an example of a plan execution history management table in accordance with a first embodiment.

A plan execution history management table 33950 is information (plan history information) for managing an execution result (the success or failure of a failure recovery) for an expansion plan that has been executed for the computer astern, for instance an expansion plan that has been executed by the plan execution module 32910. The plan execution history management table 33950 includes the fields of an expansion rule ID 33960, an expansion plan ID 33970, an execution success or failure 33980, and an execution date and time 33990. The expansion rule ID 33960 stores an expansion rule ID of an expansion rule. The expansion plan ID 33970 stores an expansion plan ID of an expansion plan. The execution success or failure 33980 stores data that indicates the success or failure of a failure recovery by an execution of an expansion plan, that is, data that indicates whether or not a recovery of a failure in which a cause event of an expansion rule that is indicated by an expansion rule ID of the expansion rule ID 33960 is a failure cause is succeeded by an execution of an expansion plan that is indicated by an expansion plan ID of the expansion plan ID 33970. For instance, the execution success or failure 33980 stores "OK" in the case in which a failure recover is succeeded in, and stores "NG" in the case in which a failure recover is failed in. The execution date and time 33990 stores data that indicates the date and time when an expansion plan is executed.

In the example of FIG. 14, each entry to history element) of the plan execution history management table 33950 indicates an expansion rule including a cause event specified as a failure cause (more specifically, as candidate of a failure cause), an expansion plan that has been executed to the failure cause, and the success or failure, of the failure recovery by an execution of the expansion plan by an association with each other. However, a configuration of the plan execution history management table 33950 is not restricted to the above configuration. Other configuration can also be adopted as long as each entry can indicate a failure cause, an expansion plan that has been executed to the failure cause, and the success or failure of the failure recovery by an execution of the expansion plan by an association with each other. For instance, each entry can indicate a cause event that has been specified as a failure cause, an expansion plan that has been executed to the failure cause, and the success or failure of the failure recovery by an execution of the expansion plan by an association with each other.

In the next place, each processing that is executed by the management server 30000 will be described.

<Acquisition Processing of the Configuration Management Information and the Update Processing of the Volume Topology Management Table>

The program control module 32100 instructs to a periodical acquisition of the configuration management information from a management target apparatus in the computer system, in the present embodiment, the storage apparatus 20000, the host computer 10000, and an IP switch 40000, to the configuration management information acquisition module 32200 by the polling processing for instance.

The configuration management information acquisition module 32200 acquires the configuration management information from the storage apparatus 20000, the host computer 10000, and an IP switch 40000, and updates data in the volume topology management table 33200 based on the configuration management information that has been acquired.

<Apparatus Performance Information Acquisition Processing and Event Analysis Processing>

Figure 15:
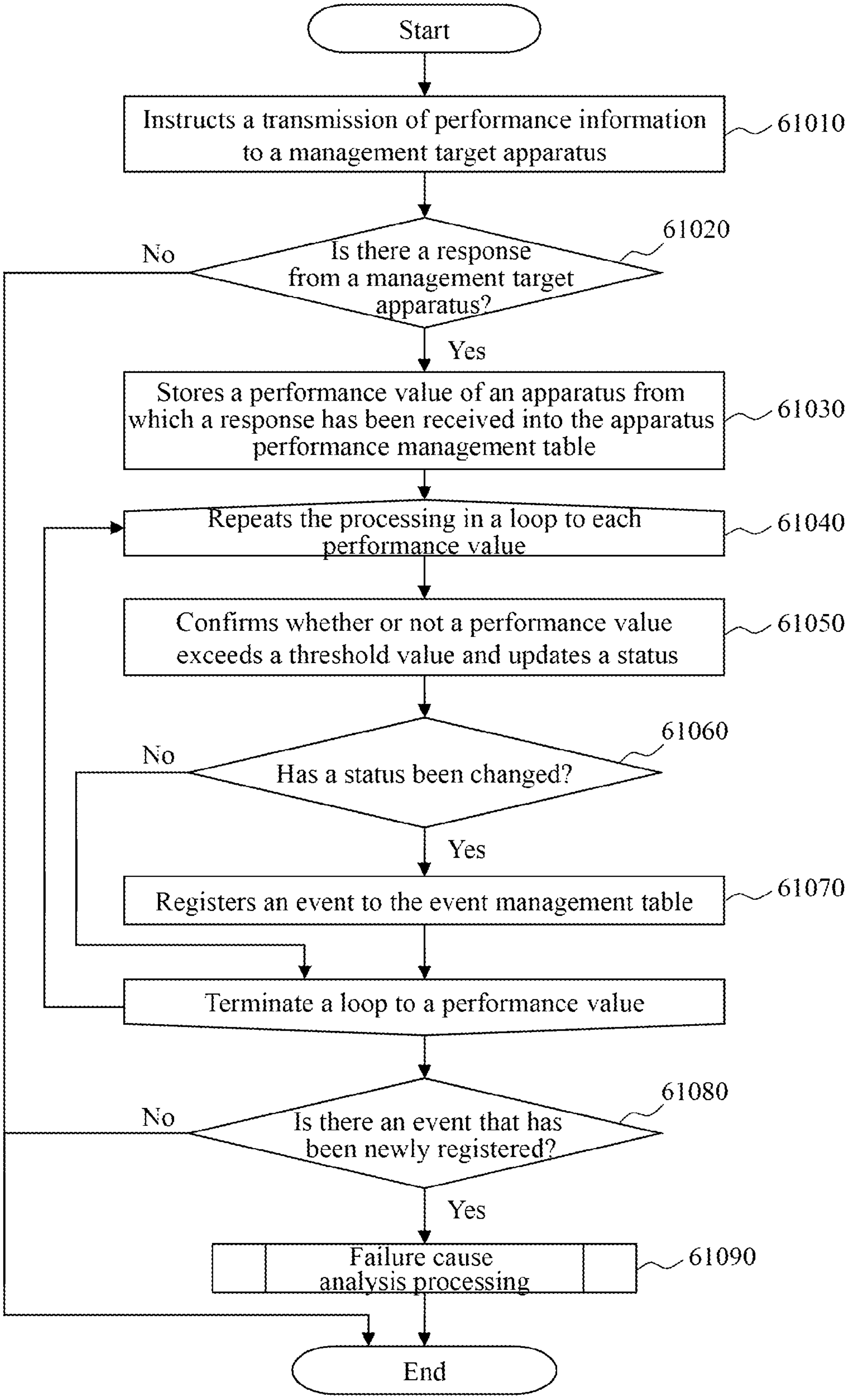
FIG. 15 is a flowchart of a performance information acquisition processing in accordance with the first embodiment.

FIG. 15 is a flowchart of a performance information acquisition processing in accordance with a first embodiment.

The program control module 32100 instructs an execution of a performance information acquisition processing to the apparatus performance acquisition module 32300 at a start-up of a program or for every elapse of a certain period of time from the previous performance information acquisition processing. In the case in which the execution indication is issued repeatedly, it is not necessary to indicate the execution at strictly regular time intervals as long as the execution indication is repeated.

The apparatus performance acquisition module 32300 repeats the following sequence of processing to each management target apparatus.

In the first place, the apparatus performance acquisition module 32300 instructs a transmission of performance information to each management target apparatus (step 61010).

The apparatus performance acquisition module 32300 determines whether or not there is a response from a management target apparatus (step 61020). In the case in which there is a response from a management target apparatus, that is, performance information has been received from a management target apparatus (step 61020: Yes), the apparatus performance acquisition module 32300 updates a value of a performance value 33150 of the apparatus performance management table 33100 based on the received performance information (step 61020). On the other hand, there is not a response from a management target apparatus (step 61020: No), the apparatus performance acquisition module 32300 terminates the performance information acquisition processing.

In the next place, the apparatus performance acquisition module 32300 refers to a performance value of each management target device that has been stored into the apparatus performance management table 33100, and repeats the processing from the step 61050 to the step 61070 for each performance value (step 61040).

The apparatus performance acquisition module 32300 confirms whether or not a performance value exceeds an alert execution threshold value, and updates a value of the status 33180 of the apparatus performance management table 33100 based on the confirmation result (step 61050). The apparatus performance acquisition module 32300 then determines whether or not a status of a performance value has been changed, that is, a performance value has been changed from a normal value to an abnormal value or from an abnormal value to a normal value (step 61060). In the case in which a performance value has been changed (step 61060: Yes), the apparatus performance acquisition module 32300 registers an entry related to an event corresponded to a change of a status of the performance value to the event management table 33700 (step 61070). On the other hand, in the case in which a performance value has not been changed (step 61060: No the apparatus performance acquisition module 32300 goes ahead with the processing to the step 61040 if a state confirmation processing to all performance values (processing from the step 61050 to the step 61070) has not been terminated.

After the state confirmation processing to all performance values is terminated, the apparatus performance acquisition module 32300 determines whether or not there is an event (an entry related to an event) that has been newly registered to the event management table 33700 (step 61080). In the case in which there is an event that has been newly registered (step 61080: Yes), the apparatus performance acquisition module 32300 instructs an execution of the failure cause analysis processing (see FIG. 16) to the event analysis processing module 32500 (step 61090). On the other hand, in the case in which there is not an event that has been newly registered (step 61080: No), the apparatus performance acquisition module 32300 terminates the performance information acquisition processing.

<Details of the Failure Cause Analysis Processing>

Figure 16:
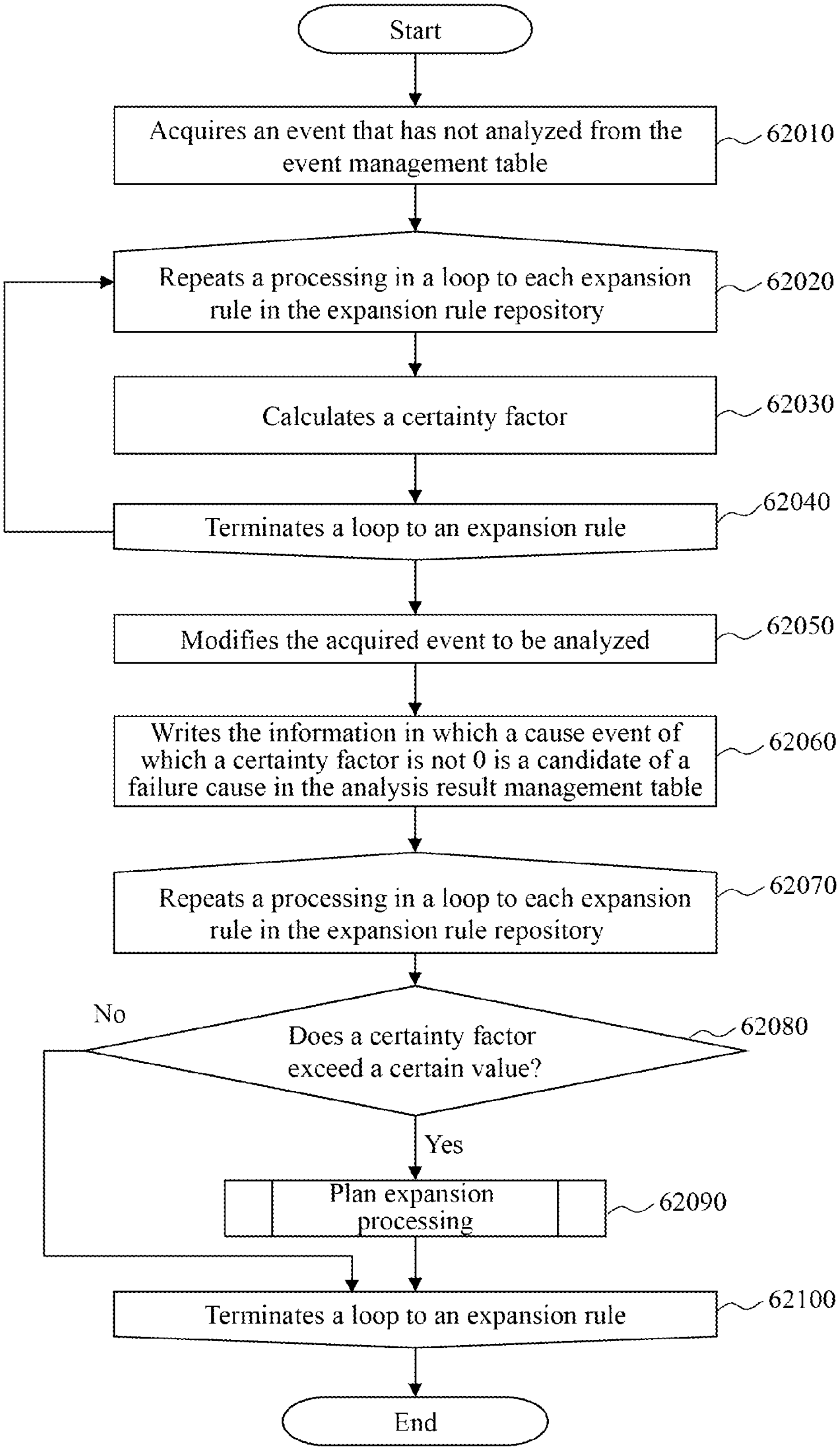
FIG. 16 is a flowchart of a failure cause analysis processing in accordance with the first embodiment.

FIG. 16 is a flowchart of a failure cause analysis processing in accordance with a first embodiment. The failure cause analysis processing is corresponded to a processing of the step 61090 of FIG. 15.

An event analysis processing module 32500 acquires an entry related to an event in which a value of an analyzed flag 33370 has not been set to be "Yes" from the event management table 33300 (step 62010).

In the next place, the event analysis processing module 32500 repeats the processing of the step 62030 to each expansion rule in the expansion rule repository 33500 (step 62020). The event analysis processing module 32500 calculates a certainty factor for an expansion rule of a processing target (a certainty factor for a cause event of an expansion rule of a processing target), that is, an occurrence rate in the past certain period of time of one or more condition events that are included in an expansion rule of a processing target (step 62030).

The event analysis processing module 32500 subsequently sets the analyzed flag 33370 of an entry that has been acquired in the step 62010 for the event management table 33300 to be "Yes" (step 62050). The event analysis processing module 32500 then creates an entry of the analysis result management table 33600 in which a cause event of the expansion rule has been specified as a candidate of a failure cause (a first cause event) for each of the expansion rules in which a certainty factor that has been calculated in the step 62030 is not 0 among the expansion rules in the expansion rule repository 33500, and registers the created entry to the analysis result management table 33600 (step 62060).

In the next place, the event analysis processing module 32500 repeats the processing from the step 62070 to the step 62100 to each expansion rule in the expansion rule repository 33500 (step 62070). The event analysis processing module 32500 determines whether or not a certainty factor that has been calculated in the step 62030 for an expansion rule of a processing target exceeds a certain value (step 62080).

In the case in which a certainty factor exceeds a certain value (step 62080: Yes), the event analysis processing module 32500 instructs an execution of the plan expansion processing for an expansion rule of a processing target to the plan expansion module 32700 (step 62090). By this plan expansion processing, an expansion plan corresponded to an expansion rule of a processing target is created, that is, in the case in which a cause event of an expansion rule of a processing target is a failure cause, an expansion plan to the failure cause is created.

On the other hand, in the case in which a certainty factor does not exceed a certain value (step 62080: No), the event analysis processing module 32500 does not execute the processing of the step 62090 for an expansion rule of a processing target.

After terminating the processing from the step 62070 to the step 62100 to each expansion rule in the expansion rule repository 335000, the event analysis processing module 32500 terminates the failure cause analysis processing.

For instance, the condition events of the expansion rule shown in FIG. 9A are two events of an event corresponded to a threshold value abnormality of a response time for the drive "/var" of the host computer HOST1 (hereafter referred to as an event A) and an event corresponded to a threshold value abnormality of an I/O amount in a unit time for the logical volume LU1 of the storage apparatus SYS1 (hereafter referred to as an event B).

In the case in which an entry related to the event B (an event provided with an event ID of "EV3" in the example of FIG. 7) is registered to the event management table 33300, the event analysis processing module 32500 refers to the event management table 33300 after waiting for a certain period of time and specifies an event that has occurred in the past certain period of time.

In the next place, the event analysis processing module 32500 calculates a certainty factor (an occurrence rate of a condition event in the past certain period of time) for an expansion rule ExRule1-1, As a result, since the event A (an event provided with an event ID of EV6 in the example of FIG. 7) has also occurred in the past certain period of time, a certainty factor for an expansion rule ExRule1-1 is 100% (2/2×100).

In the case in which a certainty factor that has been calculated as described above exceeds a certain value, the event analysis processing module 32500 instructs an execution of the plan expansion processing to the plan expansion module 32700 and makes the plan expansion module 32700 to create an expansion plan for a failure recovery. For instance, in the case in Which the above certain value is 30%, since a certainty factor for an expansion rule ExRule1-1 is 100% and exceeds 30%, an expansion plan corresponded to the expansion rule ExRule1-1 is created.

<Details of the Plan Expansion Processing>

Figure 17:
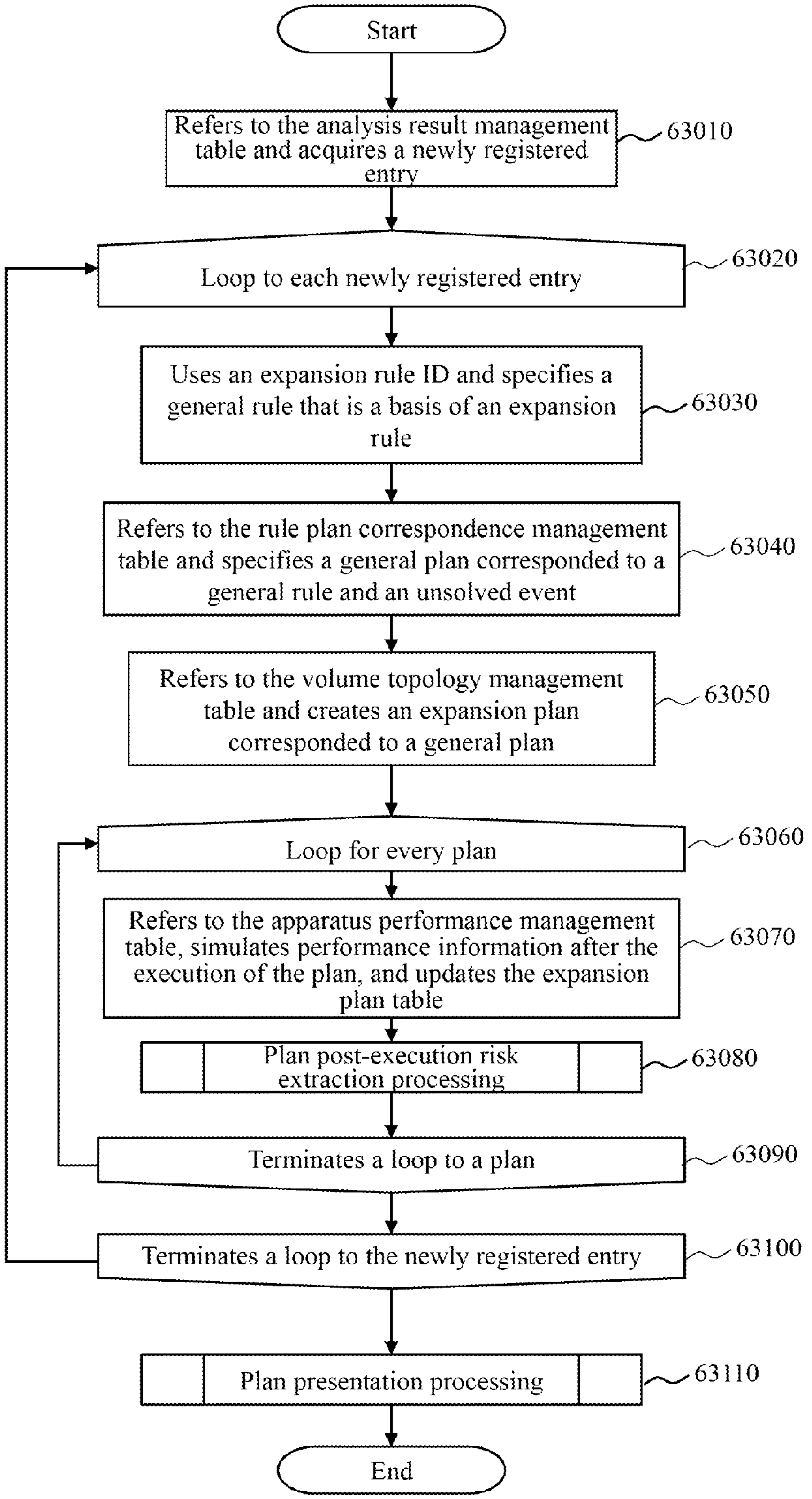
FIG. 17 is a flowchart of a plan expansion processing in accordance with the first embodiment.

FIG. 17 is a flowchart of a plan expansion processing in accordance with a first embodiment. The plan expansion processing is corresponded to a processing of the step 62090 of FIG. 16.

A plan expansion processing module 32700 acquires an entry that has been newly registered for the analysis result management table 33600 (hereafter referred to as a newly registered entry) from the analysis result management table 33600 (step 63010). The plan expansion processing module 32700 executes the processing from the following steps 63030 to 63090 to each of the newly registered entry that has been acquired (step 63020).

The plan expansion processing module 32700 acquires an expansion rule ID that has been stored into the expansion rule ID 33650 from the newly registered entry of a processing target of the analysis result management table 33600. In the following, an expansion rule that is indicated by the expansion rule ID that has been acquired here is referred to as an expansion rule of a processing target. The plan expansion processing module 32700 then acquires a general rule ID that has been stored into the pre-expansion general rule ID 33540 of the an expansion rule of a processing target (step 63030), A general rule that is indicated by the general rule ID that has been acquired here is a general rule that is a basis of an expansion rule of a processing target.

In the next place, the plan expansion processing module 32700 refers to the rule plan correspondence management table 33900 and specifies one or more general plans corresponded to a general rule that is a basis of an expansion rule of a processing target. Moreover, the plan expansion processing module 32700 refers to the rule plan correspondence management table 33900 and specifies an unsolved event corresponded to a combination of a general rule that is a basis of an expansion rule of a processing target and the specified general plan (step 63040).

In the next place, the plan expansion processing module 32700 refers to the volume topology management table 33200, creates one or more expansion plans corresponded to an expansion rule of a processing target based on the general plan that has been specified in the step 63040, and adds information related to the created expansion plan to the expansion plan table 33800 (step 63050). For instance, in the case in which a general plan of a volume migration is expanded, the plan expansion processing module 32700 specifies all of the storage apparatuses 20000 that can be a migration destination apparatus by referring to the volume topology management table 33200.

In the next place, the plan expansion processing module 32700 repeatedly executes the processing of the step 63070 and the step 63080 to each expansion plan that has been created in the step 63050 (step 63060). The plan expansion processing module 32700 refers to the apparatus performance management table 33100, calculates a predicted value of a performance value after the execution of the plan by simulating the situation after the execution of the plan, and updates a value of the plan target 33840 of an expansion plan of a processing target based on the result information of the simulation (step 63070). In the next place, the plan expansion processing module 32700 instructs an execution of a plan post-execution risk extraction processing (see FIG. 18) to the plan post-execution risk extraction module 32800 (step 63080). At this time, the plan expansion processing module 32700 inputs an unsolved event ID of an unsolved event related to an expansion plan of a processing target, that is, an unsolved event corresponded to a combination of a general rule that is a basis of an expansion rule of a processing target and a general plan that is a basis of an expansion plan of a processing target to the plan post-execution risk extraction module 32800.

After terminating the processing from the step 63030 to the step 63090 to all of the newly registered entries that have been acquired, the plan expansion processing module 32700 instructs an execution of a plan presentation processing (see FIG. 19) to the plan presentation module 32900 (step 63110), After that, the plan expansion processing module 32700 terminates the plan presentation processing.

In the present embodiment, performance information, in particular a predicted value of a response time of an PC) is taken, a predicted value of a response time of an I/O is calculated by executing an simulation, and the predicted value that has been obtained by the simulation is stored into the plan target 33840 of the expansion plan table 33800. For instance, in the case in which the expansion plan ExPlan1-1, is executed, data of the logical volume LU2 is migrated from the storage apparatus SYS1 to the storage apparatus SYS2. However, the predicted value is calculated based on a response time of an I/O of each of the current migration target volume (the logical volume LU2), a migration source apparatus (the storage apparatus SYS1), and a migration destination apparatus (the storage apparatus SYS2) that can be obtained from the apparatus performance management table 33100. Here, an example of a simulation method is described. A value that is stored into the expansion plan table 33800 can also be other than a performance value as long as the value can be an index representing the characteristics of the plan. The management server 30000 can execute a simulation similar to that of a performance value by storing information of a cost taken for a plan execution and information of time required for a plan execution into the volume topology management table 33200 or the apparatus performance management table 33100.

<Details of the Plan Post-Execution Risk Extraction Processing>

Figure 18:
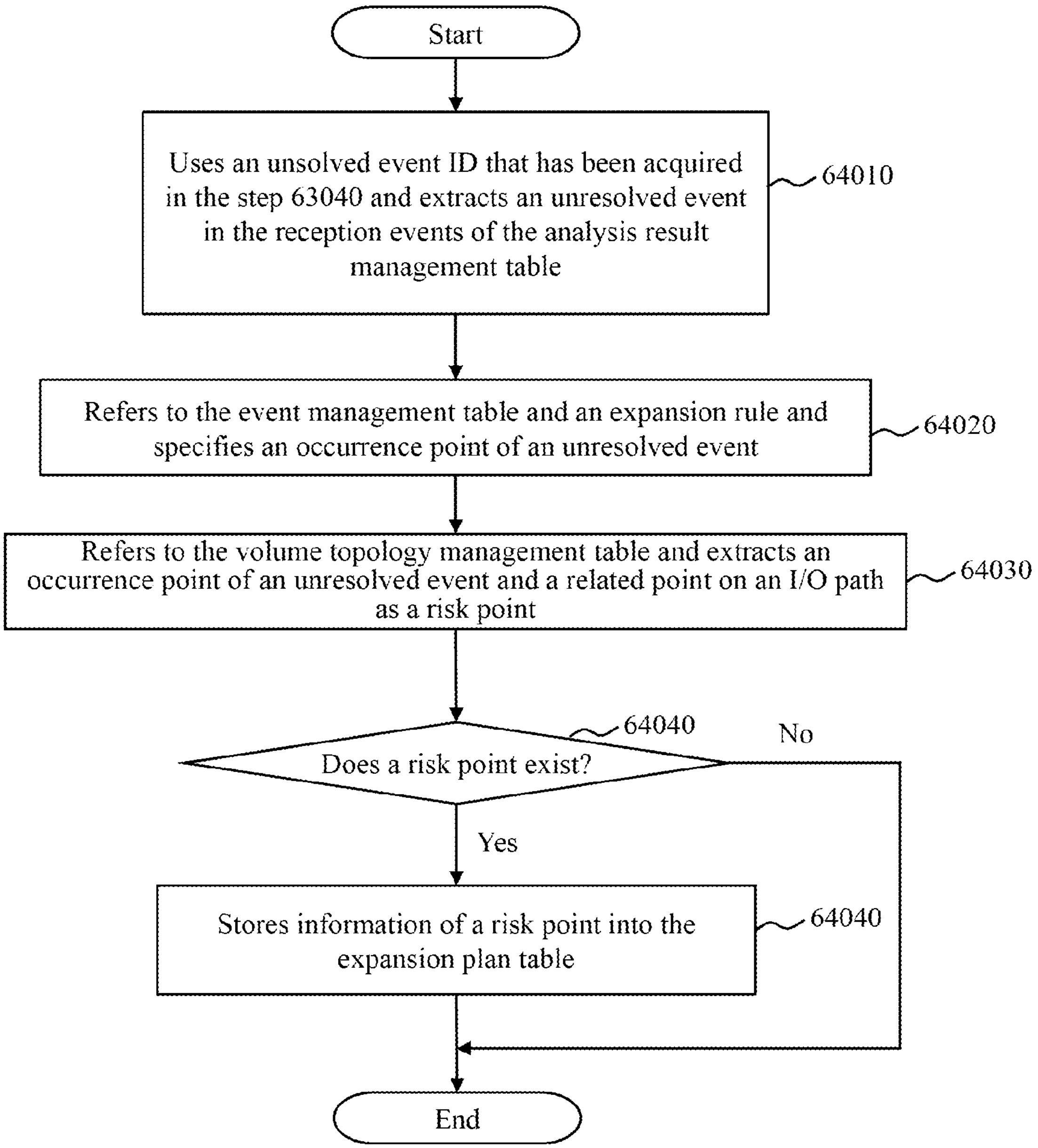
FIG. 18 is a flowchart of a plan post-execution risk extraction processing in accordance with the first embodiment.

FIG. 18 is a flowchart of a plan post-execution risk extraction processing in accordance with a first embodiment. The plan post-execution risk extraction processing is corresponded to a processing of the step 63080 of FIG. 17.

A plan post-execution risk extraction module 32800 uses an unsolved event ID that has received from the plan expansion module 32700 to extracts an unresolved event from the actually occurring condition events that have been registered to the reception event ID 33000 of the newly registered entry of the analysis result management table 33600 (step 64010). Here, an unresolved event is an event corresponded to a condition event that is indicated by an unsolved event ID among condition events that have actually occurred.

In the next place, the plan post-execution risk extraction module 32800 refers to the event management table 33300 and an expansion rule of a processing target, and specifies an occurrence point (an apparatus and a device of an occurrence source) of an unresolved event that has been extracted in the step 64010 (step 64020). In the next place, the plan post-execution risk extraction module 32800 refers to the volume topology management table 33200, and extracts an occurrence point of an unresolved, event and any one or more of an occurrence point of an unresolved event and a related point on an I/O path (an apparatus and a device) as a risk point (step 64030).

In the case in which a risk point has been extracted in the step 64030 (step 64040: Yes), the plan post-execution risk extraction module 32800 stores data that indicates the extracted risk point into the risk point 33890 of an expansion plan of a processing target of the expansion plan table 33800 (step 64040), and terminates the plan post-execution risk extraction processing. On the other hand, in the case in which a risk point has not been extracted in the step 64030 (step 64040: No), the plan post-execution risk extraction module 32800 terminates the plan post-execution risk extraction processing.

The risk point 33890 of the expansion plan table 33800 of FIG. 12 has not stored data that indicates a risk point since a risk point has not been extracted. As a risk point, points on an I/O path that is indicated by an entry of the volume topology management table 33200, such as a drive of the host computer 10000, a controller 25000 of the storage apparatus 20000, and a logical volume 24100 of the storage apparatus 20000, can be extracted for instance.

<Details of the Plan Presentation Processing>

Figure 19:
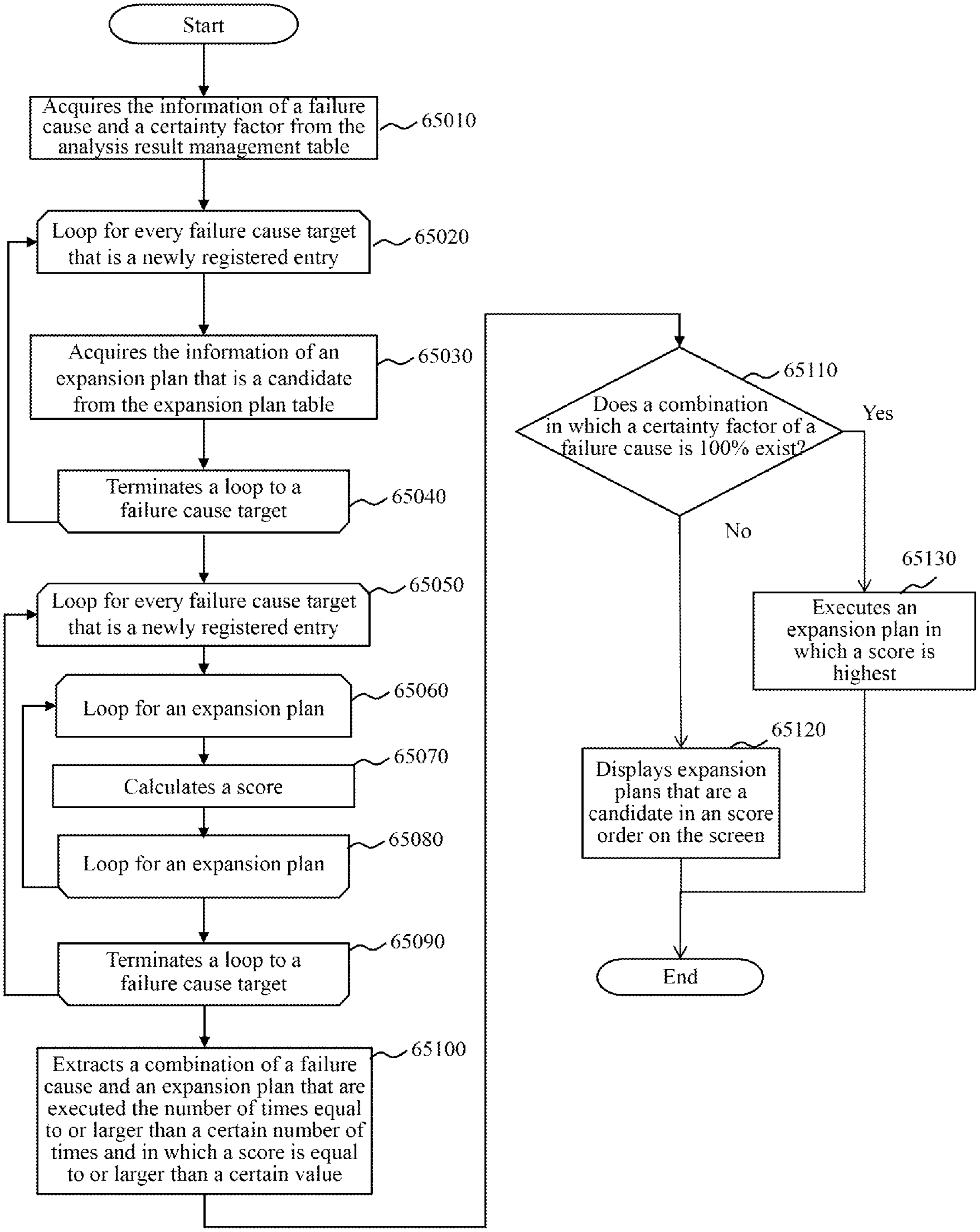
FIG. 19 is a flowchart of a plan presentation processing in accordance with the first embodiment.

FIG. 19 is a flowchart of a plan presentation processing in accordance with a first embodiment. The Plan presentation processing is corresponded to a processing of the step 63110 of FIG. 17.

A plan presentation module 32900 acquires the information that indicates a candidate of a failure cause and a certainty factor for a candidate of a failure cause, that is, a cause apparatus ID 33610, a cause region ID 33620, a metric 33630, and a certainty factor 33640 from the analysis result management table 33600 (step 65010).

In the next place, the plan presentation module 32900 executes a processing of the step 65030 to each newly registered entry of the analysis result management table 33600. The plan presentation module 32900 acquires the information related to one or more expansion plans to a failure cause that is indicated by the newly registered entry of a processing target (exactly, a candidate of a failure cause), that is, one or more expansion plans corresponded to an expansion rule that is indicated by the newly registered entry of a processing target (an expansion rule that is a candidate for a failure recovery) (a first plan) from the expansion plan table 33800 (step 65030), The expansion rule that is indicated by the newly registered entry is an expansion rule that is indicated by an expansion rule ID that has been stored into the expansion rule ID 33650 of the newly registered entry.

After terminating the processing of the step 65030 to all of the newly registered entries, the plan presentation module 32900 executes the processing from the step 65060 to the step 65080 to each newly registered entry of the analysis result management table 33600. The plan presentation module 32900 executes the processing of the step 65070 to each of one or more expansion plans to a failure cause that is indicated by the newly registered entry of a processing target (a failure cause of a processing target).

In the step 65070, the plan presentation module 32900 calculates a score value for an expansion plan of a processing target to a failure cause of a processing target based on the execution result of an expansion plan that was executed in the past and that is indicated by the plan execution history management table 33950. Here, the score value is an index value that indicates a possibility of succeeding in a failure recovery in the case in which an expansion plan is executed, that is, a potential value of improving a failure. For instance, the plan presentation module 32900 acquires all of the entries corresponded to a combination of an expansion rule that is indicated by the newly registered entry of a processing target and an expansion plan of a processing target from the plan execution history management table 33950. The plan presentation module 32900 then calculates a success rate in the case in which an expansion plan of a processing target is executed to a failure cause of a processing target based on data that indicates the success or failure of a failure recovery of each of one or more entries that have been acquired, more specifically, a rate of the number of entries in which "OK" has been stored into the execution success or failure 33980 among the acquired entries to the total number of the acquired entries as a score value.

In the present embodiment, a success rate is used as a score value. However for instance, a value(s) that is obtained by the expression 1 can also be a score value. The expression 1 is an expression for dividing the execution results in the plan execution history management table 33950 for every predetermined period of time, weighting a success rate (Ri) that has been calculated for every period of time with a weighted value ($1/2^i$) based on the period of time, and obtaining the total sum of as success rate ($Ri/2^i$) after weighting as a score value. In the expression 1, a success rate of a more recent period of time is weighted more, and a score value is calculated in such a manner that a value is higher to a more recent success. In the expression 1, Ri represents a success rate of a period of time from i hours ago to (DD hours ago (n is a predetermined value, for instance 1).

$$s=\Sigma(Ri/2^i) \quad \text{(Expression 1)}$$

A score value is not restricted to a success rate or a success rate after weighting, and can also be a value other that the success rates. For instance, the number of executions of an expansion plan in addition to a success rate, that is, a value considering the number of the execution results in the plan execution history management table 33950 can also be used as score value. Moreover, the number of executions of an expansion plan without any change can also be used as score value. As an example of a case in which the number of executions of an expansion plan in addition to a success rate is considered, a score value can be decide in such a manner that a value is higher when the number of executions is larger in the case in which success rates are identical or similar for instance. Moreover, a score value can be decide in such a manner that a value is higher in the case in which a period of time from when an expansion plan WAS executed and a failure was improved to the present time is longer and a failure has not occurred again in the period of time for instance. Furthermore, the management server 30000 can prepare a plurality of kinds of calculation methods of a score value in advance and switch a calculation method of a score value depending on a state in an execution based on a predetermined policy.

After terminating the processing from the step 65000 to the step 65080 to all of the newly registered entries, the plan presentation module 32900 extracts a combination of a failure cause and an expansion plan that are executed the number of times equal to or larger than the predetermined number of times in the past and in which a score value is equal to or larger than a predetermined value from combinations of a failure cause and an expansion plan that are a target of the processing of the step 65070 (a calculation processing of a score value) (step 65100). In this case, the plan presentation module 32900 can also extract a combination of a failure cause and an expansion plan in which the number of execution results in the plan execution history management table 33950 is significantly large obviously for instance. An extraction method is not restricted as long as the method can indicate the characteristics of an expansion plan of a manager.

In the next place, the plan presentation module 32900 determines whether or not a combination in which a certainty factor for the failure cause is 100% exists in combinations of a failure cause and an expansion plan that have been extracted (step 65110).

In the case in which a combination in which a certainty factor is 100% does not exist (step 65110: No), the plan presentation module 32900 creates a an presentation screen (see FIG. 20) based on the information that indicates a candidate of a failure cause that has been acquired in the step 65010, a certainty factor for a candidate of a failure cause, the information related to an expansion plan that is a candidate that has been acquired in the step 65030, and a score value for each expansion plan that has been calculated in the step 65070, and displays the created plan presentation screen on the output device 31200 (step 65120). For instance, in the plan presentation screen, one or more expansion plans of expansion plans that are a candidate (hereafter referred to as a presentation plan) are arranged and displayed in an order from higher score value. A presentation plan is an expansion plan in which a score value is equal to or larger than a predetermined value among expansion plans that are a candidate for instance. After that, the plan presentation module 32900 terminates the plan presentation processing.

On the other hand, in the case in which a combination in which a certainty factor is 100% exists (step 65110: Yes), the plan presentation module 32900 specifies an expansion plan that is included in a combination in which a score value is highest in combinations in which to certainty factor is 100%, that is, an expansion plan in which a score value is highest in expansion plans to a failure cause in which a certainty factor is 100%. The plan presentation module 32900 then instructs an execution of a plan execution processing (see FIG. 21) for the specified expansion plan to the plan execution module 32910 (step 65130). By the plan execution processing, an expansion plan in which a score value is highest in expansion plans to a failure cause in which a certainty factor is 100% is automatically executed. After that, the plan presentation module 32900 terminates the plan presentation processing.

In the present embodiment, in the case in which a failure cause in which a certainty factor is 100% exists, the management server 30000 automatically executes an expansion plan in which a score value is highest to a failure cause in which a certainty factor is 100%. However, a determination standard of whether or not the automatic execution is done is not restricted to that a certainty factor is 100%. For instance, in the case in which a certainty factor is equal to or larger than a predetermined value (such as a value close to 100%), the management server 30000 can automatically execute an expansion plan (a second plan) in which a score value is highest to a failure cause in which a certainty factor is equal to or larger than a predetermined value. Moreover for instance, in the case in which a certainty factor is equal to or larger than a predetermined value and the maximum value of a score value (a score value for a second plan) for each of a Plurality of expansion plans to a failure cause in which a certainty factor is equal to or larger than a predetermined value is equal to or larger than a predetermined value, the management server 30000 can automatically execute an expansion plan (a second plan) provided with the maximum score value. Moreover, before doing an automatic execution, the management server 30000 can ask a manager for an approval of doing an automatic execution. Before doing an automatic execution or after doing an automatic execution, the management server 30000 can execute the processing of the step 65120 and display a plan presentation screen.

FIG. 20 is a block diagram showing an example of a plan presentation screen in accordance with a first embodiment.

In the case in which a failure occurs in a computer system, a plan presentation screen is provided with a display area 71010 for displaying the information that is referred to in the case in which a manager pursues the cause and executes a countermeasure, more specifically, as correspondence relationship between a candidate of a failure cause and a list of an expansion plan that can be executed to the candidate of a failure cause (one or more expansion plans in expansion plans that is a candidate, that is, a presentation plan), and a plan execution button 71020 for instructing an execution of an expansion plan.

The display area 71010 for displaying a correspondence relationship between a candidate of a failure cause and an expansion plan displays an apparatus ID of a management target apparatus related to an event corresponded to a candidate of a failure cause, a device ID of a management target device related to an event corresponded to a candidate of a failure cause, a type of an event corresponded to a candidate of a failure cause, and a certainty factor for a candidate of a failure cause, that is, a rate of the number of condition events that have actually occurred to the total number of condition events as the information that indicates a candidate of a failure cause for instance. Those values are acquired by the plan presentation module 32900 from the analysis result management table 33600 in the step 65010 of FIG. 19 for instance.

Moreover, the display area 71010 displays the information that indicates the contents of an expansion plan, a cost that is taken for an execution of an expansion plan, a time that is required for an execution of an expansion plan, that is, a time when a failure continues to remain (down time), and the information that indicates a risk point as the information related to an expansion plan (a presentation plan) to a candidate of a failure cause. Those values are acquired by the plan presentation module 32900 from the expansion plan table 33800 in the step 65030 of FIG. 19 for instance, Here, a plurality of expansion plans to a candidate of a failure cause are arranged and displayed, in an order from an expansion plan with higher score value calculated in the step 65070. Moreover, as plurality of expansion plans can also be arranged based on the characteristics of an expansion plan, such as in an order from an expansion plan with a less cost required for an execution of an expansion plan, in an order from an expansion plan with a time required for an execution of an expansion plan, and in an order from an expansion plan in which a risk point does not exist. As a method of an arrangement, any method can be adopted, such as arranging in an order from an expansion plan with a less cost by clicking "Cost ($)" in the display area 71010.

The plan execution button 71020 is a button for instructing an execution of an expansion plan that has been selected. In the case in which the button is pressed, the management server 30000 issues an execution indication of an expansion plan to a program that provides a function equivalent to an expansion plan that has been selected. The program that has received the execution indication of an expansion plan executes the expansion plan that has been selected. Here, the program that executes an expansion plan is a program in the memory 32000 of the management server 30000, such as a volume migration program (not shown) and a VM migration program (not shown).

Moreover, the display area 71010 can also display the predicted value of a performance value before an execution of an expansion plan and a performance value after an execution of an expansion plan, which has be stared into the plan target 33840 of the expansion plan table 33800 in addition. Furthermore, a performance value and a predicted value of a performance value can also be displayed in a graph form as, trend information.

FIG. 20 is an example of a plan presentation screen. The display area 71010 can also display the information that indicates the characteristics of an expansion plan other than a cost required for an execution of an expansion plan and a time required for an execution of an expansion plan, for instance, a score value calculated in the step 65070 in addition. Furthermore, other display mode can also be adopted.

<Details of the Plan Execution Processing>

Figure 21:
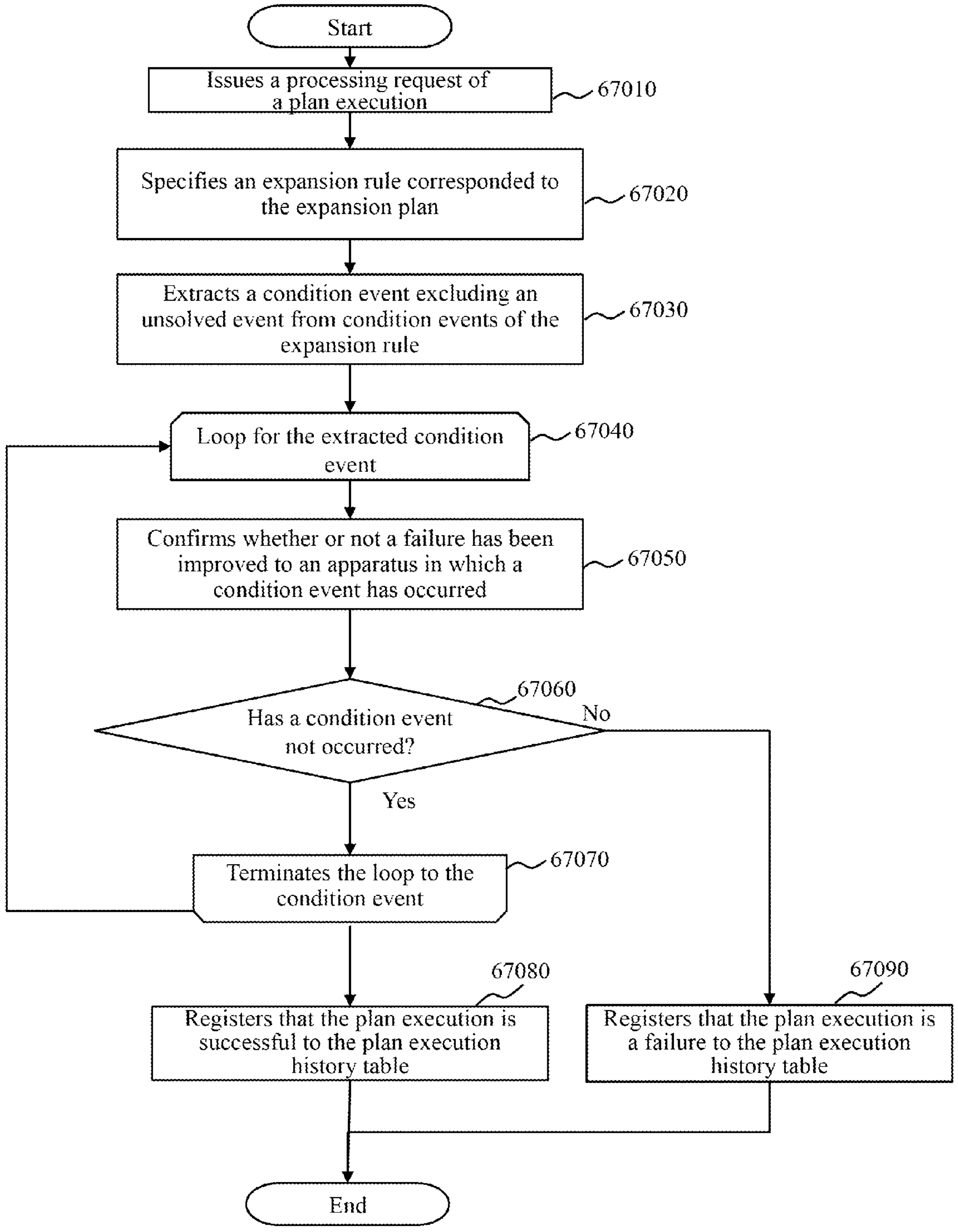
FIG. 21 is a flowchart of a plan execution processing in accordance with the first embodiment.

FIG. 21 is a flowchart of a plan execution processing in accordance with a first embodiment.

In the case in which one expansion plan is selected from the display area 71010 and the plan execution button 71020 is pressed in the plan presentation screen, a plan execution module 32910 starts the execution of a plan execution processing.

In the first place, the plan execution module 32910 instructs an execution of an expansion plan that has been selected to a program that provides a function equivalent to the expansion plan that has been selected (step 67010) Here, a program that executes an expansion plan is a volume migration program and a VM migration program for instance. A processing that is executed by the program is identical or similar to a processing of the conventional technique that is disclosed in cited literatures. Moreover, the plan execution module 32910 can also avoid a competitive situation by using a general mechanism for carrying out the execution sequence control and competition avoidance in the case in which the processing is executed.

In the next place, the plan execution module 32910 refers to an expansion rule ID 33823 of the expansion plan table 33800, and specifies an expansion rule corresponded to the expansion plan that has been selected (step 67020). The plan execution module 32910 then extracts a condition event that is not corresponded to an unsolved event related to the expansion plan that has been selected from condition events of the specified expansion rule (step 67030). Here, the plan execution module 32910 refers to the rule plan correspondence management table 33900 and specifies an unsolved event corresponded to a combination of a general rule, that is as basis of the specified expansion rule and a general plan that is a basis of the selected expansion plan as an unsolved event related to the selected expansion plan.

The plan execution module 32910 executes a processing of the steps 67050 and 67060 to each condition event that has been extracted. In the first place, the Plan execution module 32910 instructs an execution of a confirmation processing of whether or not a failure has been improved to the plan execution result confirmation module 32920. The plan execution result confirmation module 32920 that has received an instruction of an execution of a confirmation processing asks whether or not a failure corresponded to a condition event of a processing target has been improved, that is, whether or not it is in a state in which a condition event of a processing target has not occurred to a management target apparatus of an occurrence source of a condition event of a processing target (step 67050).

In the case in which it is in a state in which a condition event of a processing target has not occurred (step 67060: Yes), the plan execution result confirmation module 32920 executes a confirmation processing for a condition event that has not been a target of a confirmation processing. In the case in which it is in a state in which all of the condition events that have been extracted in the step 67030 has not occurred, the plan execution module 32910 registers an entry that indicates that the selected expansion plan has been executed and the execution result is successful to the plan execution history management table 33950 (step 67080). An expansion rule ID of the expansion rule that has been specified in the step 67020 is stored into the expansion rule ID 33960 of the entry that is registered here, an expansion plan ID of the expansion plan that has been selected is stored into the expansion plan ID 33970, "OK" is stored into the execution success or failure 33980, and data that indicates the current date and time is stored into the execution date and time 33990 for instance. After that, the plan execution module 32910 terminates the plan execution processing.

In the case in which it is in a state in which at least one condition event has occurred (step 67060: No), the plan execution result confirmation module 32920 registers an entry that: indicates that the selected expansion plan has been executed and the execution result is a failure to the plan execution history management table 33950 (step 67090). An expansion rule ID of the expansion rule that has been specified in the step 67020 is stored into the expansion rule ID 33960 of the entry that is registered here, an expansion plan ID of the expansion plan that has been selected is stored into the expansion plan ID 33970, "NG" is stored into the execution success or failure 33980, and data that indicates the current date and time is stored into the execution date and time 33990 for instance. After that, the plan execution module 32910 terminates the plan execution processing.

In the present embodiment, the management server 30000 determines a success in the case in which all of events that have been expected to be solved by an execution of an expansion plan (events that are not corresponded to an unsolved event) in condition events that are included in an expansion rule corresponded to an expansion plan is solved. However, a determination method of an execution result of an expansion plan is not restricted to the above method. The management server 30000 can also determine a success or a failure by a degree of an improvement of a service level caused by an execution of an expansion plan (whether or not a predetermined service level has been satisfied) or whether or not a rate of the number of events that have actually been solved to the total number of events that have been expected to be solved reaches a value equal to or larger than a certain value. In a confirmation processing of whether or not a failure has been improved, a means for inspecting whether or not a failure has been recovered, which is described in Non Patent Literature 1, can also be used.

In the first embodiment, the management server 30000 stores data that indicates the success or failure of a failure recovery by an execution of an expansion plan as a history after the execution. The management server 30000 then introduces a failure cause and an expansion plan to the failure cause in a failure occurrence, and scores an expansion plan depending on the past execution success or failure situation of the expansion plan that has been introduced. The management server 30000 determines whether or not automatic coping is possible depending on a certainty factor and a score value for a failure cause. In the case in which automatic coping is possible, the management server 30000 can carry out a failure recovery by automatically executing an expansion plan in which a score value is highest. The management server 30000 can obtain an approval of a manager before automatically executing an expansion plan. In the case in which automatic coping is impossible, the management server 30000 arranges and displays data, that indicates a plurality of expansion plans to a failure cause in an order from an expansion plan with a higher score value and presents the data to a manager. By this configuration, a manager can easily know an expansion plan likely to succeed in a failure recovery, rapidly select, an expansion plan likely to succeed in a failure recovery as an expansion rule to be executed, and reduce an operation management cost for a failure recovery.

For instance, in the case in which an execution performance of an application server that is being operated on a certain host computer 10000 is deteriorated, it is assumed that a manager selects an expansion plan that is executed to a failure of a deterioration of an execution performance of the application server. For instance, in the case in which an expansion plan that was executed to a failure in the past is recorded and a technique for utilizing the recorded information when the expansion plan is selected (a technique disclosed in Patent Literature 4) is adopted, in the case in which (1) a restart of a process of an application server and (2) a restart of the host computer 10000 are executed as an expansion plan, the management server 30000 can recommend an expansion plan that was executed in the past, that is, the expansion plan (1) and the expansion plan (2) to a manager equally. For instance, in the case in which a start-up of many other processes on the host computer 10000 is a failure cause, a failure has the potential to be not solved even if the expansion plan (1) is executed. Even in this case, the management server 30000 recommends the expansion plan (1) and the expansion plan (2) to a manager equally. In response, in the present embodiment, the management server 30000 calculates a score value based on the success or failure of a failure recovery caused by an execution of an expansion plan that was executed in the past, arranges data that indicates a plurality of expansion plans that are a candidate in an order from higher score value, and presents the data to a manger. Consequently, in the case in which a failure recover is failed in for the past execution of the expansion plan (1) and a failure recover is succeeded in for the past execution of the expansion plan (2) for instance, a score value of the expansion plan (2) is higher than a score value of the expansion plan (1). Therefore, the management server 30000 displays the expansion plan (2) on the higher level than the expansion plan (1), and presents the expansion plan (2) to a manager preferentially to the expansion plan (1). As a result, a manager can easily know the expansion plan (2) that is an expansion plan that has succeeded in a failure recover and that is thought to have the high potential to succeed in a failure recover, and can rapidly select the expansion plan (2) as an expansion rule to be executed.

(2) Second Embodiment

In the next place, a second embodiment will be described. In the following descriptions, a difference from the first embodiment will be described mainly, and the descriptions of identical or similar composition elements, programs provided with identical or similar functions, and tables provided with identical or similar items will be omitted.

In the first embodiment, in the case in which a plurality of expansion plans exist as an expansion plan to a failure cause, the management server 30000 supports a manager to rapidly select a suitable expansion plan base on a score value that has been calculated while referring to the past execution history. However, in the case in which the past execution number of an expansion plan is less and the number of the past execution results that have been stored into the plan execution history management table 33950 is less, the history data for ensuring the validity of a score value is not sufficient. In the case in which an expansion plan is selected based on a score value in such a case, it is unclear whether or not the selected expansion plan is most suitable. Moreover, since an expansion plan with low score value is less likely to be selected, history data is less likely to be increased for an expansion plan with low score value. For instance, in the case in which there are two expansion plans (an expansion plan A and an expansion plan B) as an expansion plan that is a candidate, the two expansion plans have been executed just once, the expansion Plan A has succeeded in a failure recovery, and the expansion plan B has failed in a failure recovery, a score value of the expansion plan A is higher than a score value of the expansion plan B, whereby the expansion plan A has the high potential to be selected. However, the past execution number of the expansion plan A and the expansion plan B is just one, and it is also thought that the expansion plan A has succeeded in a failure recovery incidentally and the expansion plan B has failed in a failure recovery incidentally. Consequently, it is not necessarily said that the expansion plan A is most suitable. Moreover, since history data is less likely to be increased and the score value is less likely to be increased subsequently for the expansion plan B that is less likely to be selected, the expansion plan A is preferentially selected constantly after that as a result.

In the second embodiment, the management server 30000 extracts a test case related to an expansion plan of which an execution number is less, and the management server 30000 or a manager executes a test for an expansion plan of which an execution number is less in a test environment before an operation start for instance and creates the history data for the expansion plan.

Figure 22:
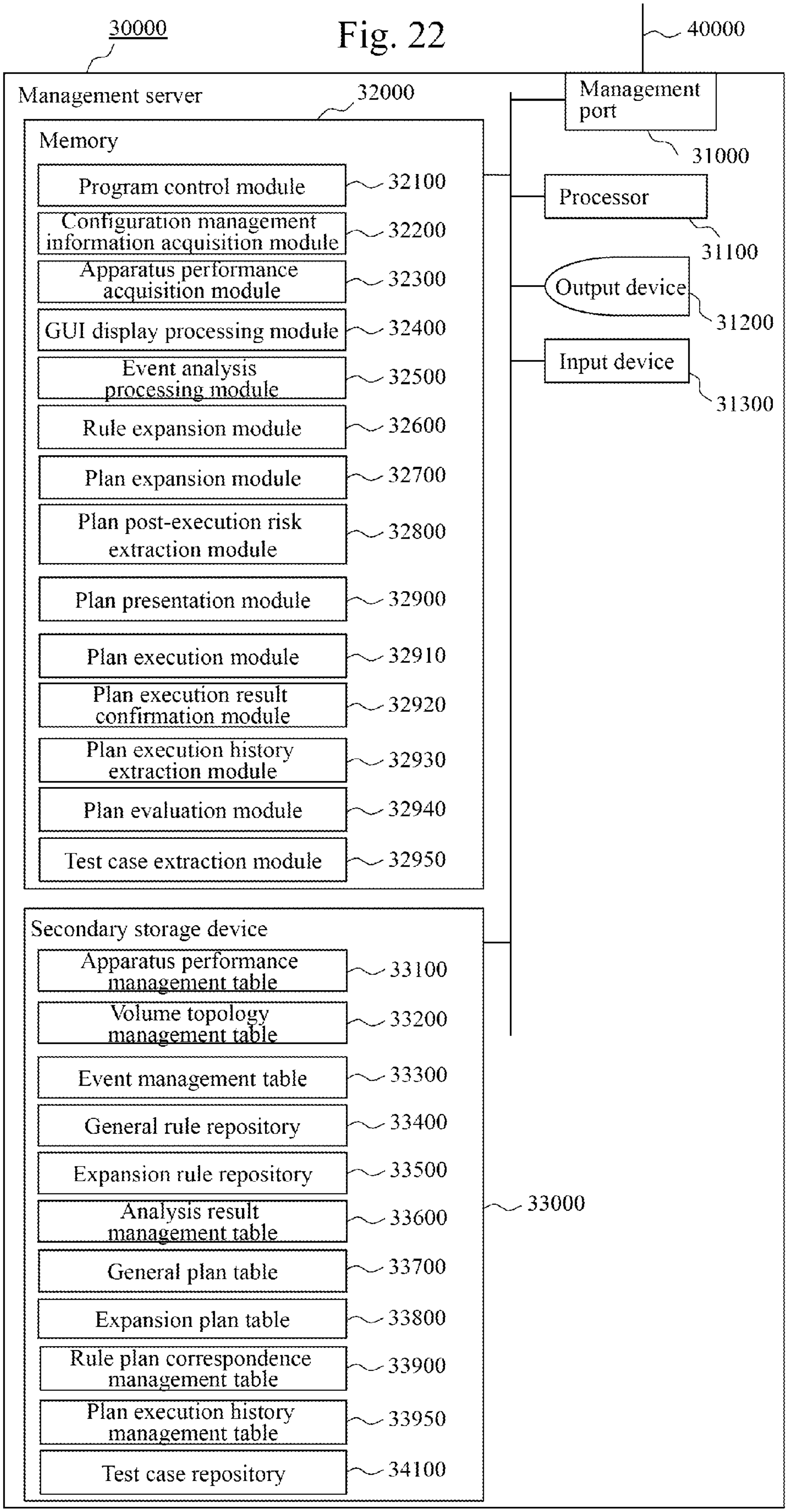
FIG. 22 is a block diagram showing an example of a management server in accordance with a second embodiment.

FIG. 22 is a block diagram showing an example of a management server in accordance with a second embodiment.

The memory 32000 of the management server 30000 stores a computer program of a test case extraction module 32950 additionally. Moreover, the secondary storage device 33000 of the management server 30000 stores a test case repository 34100 additionally.

FIG. 23 is a block diagram showing an example of a test case repository in accordance with a second embodiment.

The test case repository 34100 includes the fields of the failure event information 34110, an expansion rule ID 34120, and an expansion plan ID 34130. The failure event information 34110 stores the information related to an event (a condition event and a cause event) included in an expansion rule that is indicated by an expansion rule ID of the expansion rule ID 34120. The expansion rule ID 34120 stores an expansion rule ID of an expansion rule in which an event corresponded to a failure cause of a test target is a cause event. The expansion plan ID 34130 stores an expansion plan ID of an expansion plan of a test target.

Figure 24:
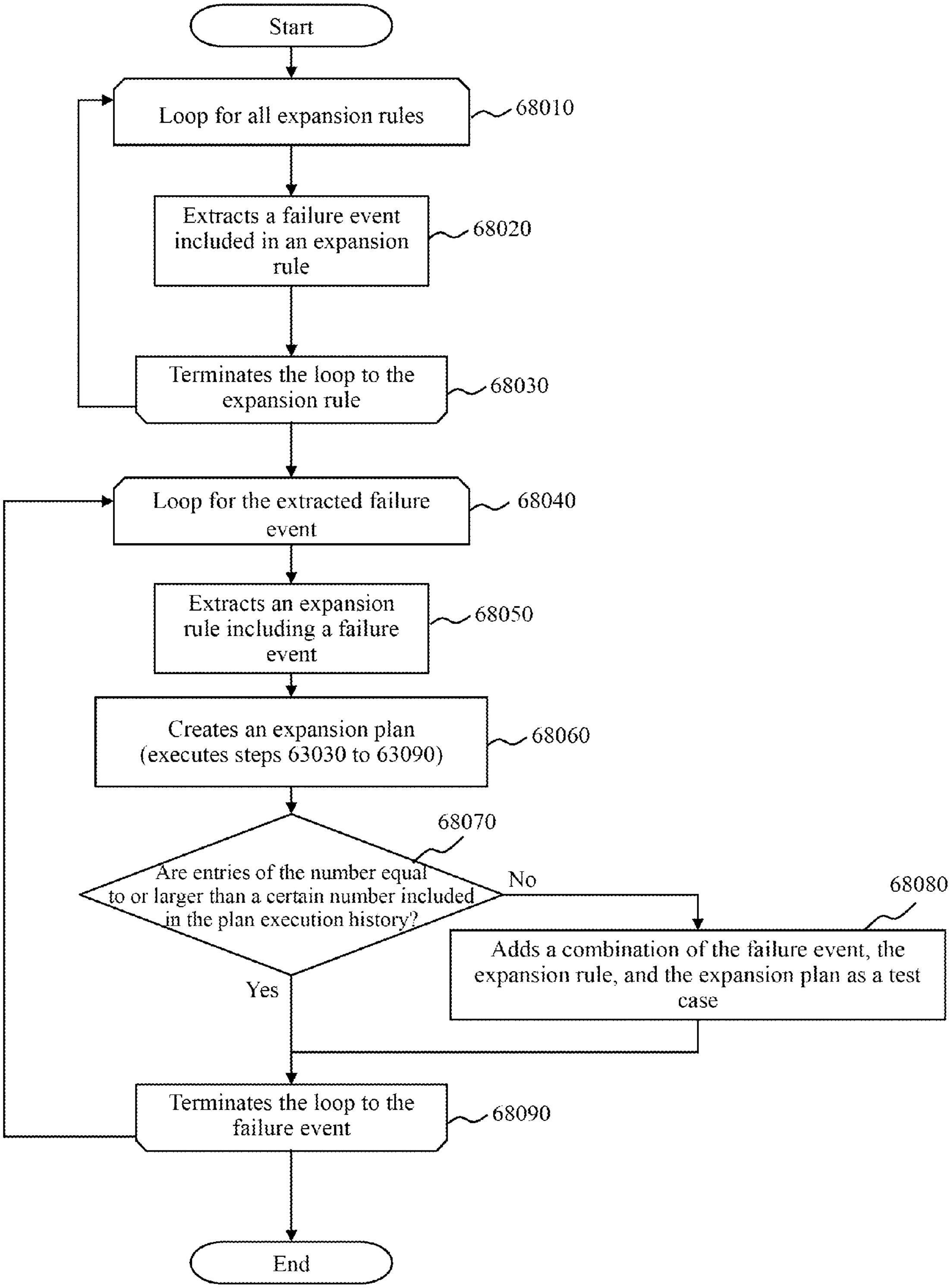
FIG. 24 is a flowchart of a test case extraction processing in accordance with the second embodiment.

FIG. 24 is a flowchart of a test case extraction processing in accordance with a second embodiment.

The test case extraction module 32950 executes a processing of the step 68020 for all of the expansion rules that are included in the expansion rule repository 33500. In the step 68020, the test case extraction module 32950 extracts an event (a condition event, and a cause event) included in an expansion plan of a processing target.

The test case extraction module 32950 executes the processing from the step 68040 to the step 68090 to each event that has been extracted in the step 68020.

In the first, place, the test case extraction module 32950 extracts an expansion rule that includes an event of a processing target from the expansion rule repository 33500 (step 68050). The test case extraction module 32950 then executes the processing from the step 63030 to the step 63090 of FIG. 17, thereby creates an expansion plan corresponded to the extracted expansion rule, that is, an expansion plan to a failure cause in the case in which a cause event of the extracted expansion rule is the failure cause (step 68060).

After that, the test case extraction module 32950 acquires all of entries corresponded to a combination of the expansion rule that has been extracted in the step 68050 and the expansion plan that has been created in the step 68060 from the plan execution history management table 33950. The test case extraction module 32950 then determines whether or not the number of entries that have been acquired is equal to or larger than a certain number (step 68070).

In the case in which the number of entries that have been acquired is not equal to or larger than a certain number (step 68070: No), the test case extraction module 32950 creates an entry of the test case repository 34100 relates to a test case that is indicated by a combination of the expansion rule that has been extracted in the step 68050 and the expansion plan that has been created in the step 68060, and adds the created entry to the test case repository 34100. The failure event information 34110 of this entry stores the information related to each of one or more condition events and cause events of the expansion rule that has been extracted in the step 68050. The expansion rule ID 34120 of this entry stores an expansion rule ID of the expansion rule that has been extracted in the step 68050. The expansion plan ID 34130 of this entry stores an expansion plan ID of the expansion plan that has been created in the step 68060.

After terminating the processing from the step 68040 to the step 68090 to each event that has been extracted in the step 68020, the test case extraction module 32950 terminates the test case extraction processing The management server 30000 or a manager in accordance with the present embodiment, executes a test corresponded to the test case for each of the test cases that have been registered to the test case repository 34100 before an operation start for instance. The management server 30000 or a manager then registers a test result, that is, an execution result of an expansion plan to the plan execution history management table 33950. For instance, in the case in which a test case that is indicated by a combination of an expansion rule ExRule1-1 and an expansion plan ExPlan1-1 has been registered to the test case repository 34100, the management server 30000 or a manager creates a failure situation (a failure situation in which a cause event of the expansion rule ExRule1-1 is a failure cause) in a pseudo fashion by generating a condition event or a cause event of the expansion rule ExRule1-1 in a pseudo fashion for instance, and executes the expansion plan ExPlan1-1 under the situation. Moreover, the management server 30000 or a manager registers data that indicates whether or not a recovery of a failure in which a cause event of an expansion rule ExRule1-1 is a failure cause has been succeeded in to the plan execution history management table 33950 by an execution of the expansion plan ExPlan1-1, in the present embodiment, an execution result of an expansion plan that has been obtained by the test is also utilized in the case of a calculation of a score value.

In the second embodiment, the management server 30000 adds a combination of an expansion rule and an expansion plan in which the history data is not sufficient as a test case to the test case repository 34100. The management server 30000 or a manager then executes a test corresponded to a test case that has been registered to the test case repository 34100 in an introduction of the management server 30000 for instance, and registers a test result to the plan execution history management table 33950. By this configuration, sufficient history data can be ensured for all expansion plans, and a bias in an execution history between expansion plans can be prevented. Moreover, since a score value is calculated based on the sufficient history data and the validity of the score value is ensured, the management server 30000 or a manager can select more suitable expansion plan based on a score value.

(3) Third Embodiment

In the next place, a third embodiment will be described. In the following descriptions, a difference from the first embodiment will be described mainly, and the descriptions of identical or similar composition elements, programs provided with identical or similar functions, and tables provided with identical or similar items will be omitted.

As described in the second embodiment, in the case in which the history data is insufficient, it is unclear whether or not the most suitable expansion plan is selected based on a score value. Moreover, since the history data is less likely to be increased for an expansion plan with low score value, an expansion plan in which a high score value was calculated at first is likely to be selected constantly after that. In the third embodiment, a computer system is configured by a plurality of sub systems (a management unit of the management server 30000, hereafter referred to as a domain), and the case in which the management server 30000 is configured for every domain is assumed. In the case in which a manager of other domain frequently executes another expansion plan to a similar failure that has occurred for other management target apparatus group that exists in other domain, it is thought that the expansion plan is more suitable. In the present embodiment, in the case in which a communication is executed between management servers 30000 of a plurality of domains and the number of histories of an expansion plan to the identical or similar failure is equal to or larger than a certain number, a score value is calculated in consideration of the configuration.

Figure 25:
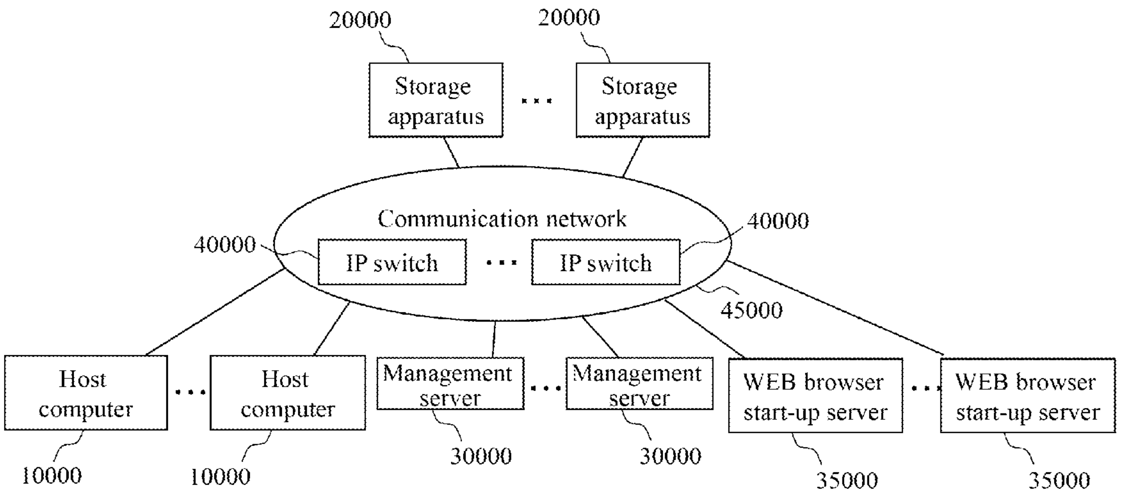
FIG. 25 is a block diagram showing an example of a computer system in accordance with a third embodiment.

FIG. 25 is a block diagram showing an example of a computer system in accordance with a third embodiment.

A computer system in accordance with the third embodiment is provided with a plurality of management servers 30000 for managing each of a plurality of domains and a plurality of WEB browser start-up servers 35000 that: are display computers of each of a plurality of management servers 30000. The plurality of management servers 30000 is utilized by different managers.

Figure 26:
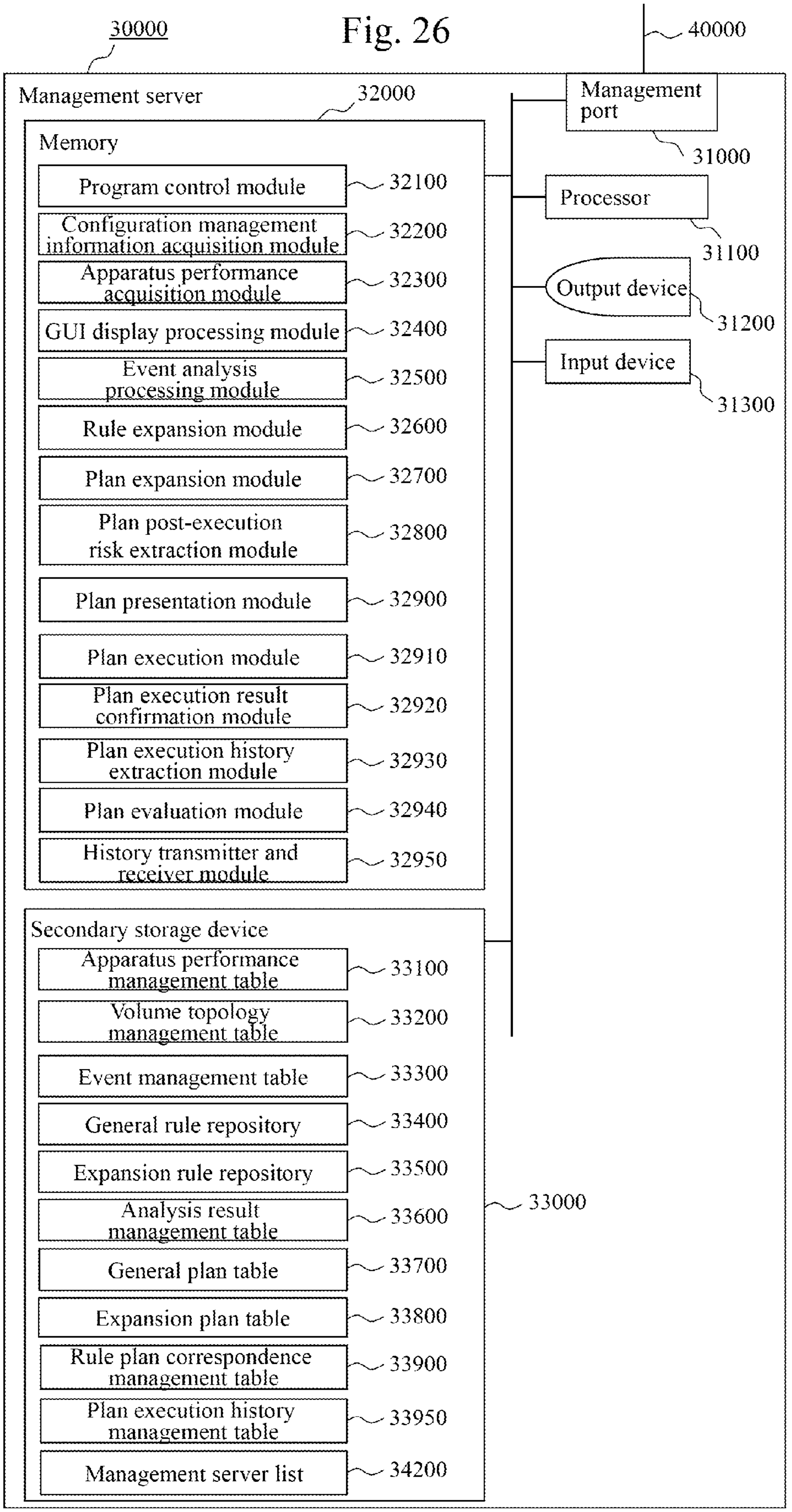
FIG. 26 is a block diagram showing an example of a management server in accordance with the third embodiment.

FIG. 26 is a block diagram showing an example of a management server in accordance with a third embodiment.

The memory 32000 of the management server 30000 stores a computer program of a history transmitter and receiver module 32950 additionally. Moreover, the secondary storage device 33000 of the management server 30000 stores a management server list 34200 additionally.

FIG. 27 is a block diagram showing an example of a plan execution history management table 33950 in accordance with a third embodiment.

The plan execution history management table 33950 in accordance with a third embodiment further includes an external reception 33995 that is a field for storing data that indicates whether or not it is history data that has been received from the management server 30000 of other domain and a transmission source server 33997 that is a field for storing data that indicates the management server 30000 of a transmission source of the history data for the history data that has been received from the management server 30000 of other domain in addition to each field of the plan execution history management table 33950 in accordance with the first embodiment. For instance, in the case in which history data that is indicated by an entry is history data that has been received from the management server 30000 of other domain, that is, history data that has been obtained by an execution of an expansion plan for other domain, "Yes" is stored into the external reception 33995. In the case in which history data that is indicated by an entry is not history data that has been received from the management server 30000 of other domain, that is, in the case in which history data that is indicated by an entry is history data that has been obtained by an execution of an expansion plan for a domain (self-domain) that is managed by the management server 30000 provided with the plan execution history management table 33950, "NULL" is stored into the external reception 33995.

FIG. 28 is a block diagram showing an example of a management server list in accordance with a third embodiment.

A management server list 34200 includes a server ID 34210 that is a field for storing data that indicates each of a plurality of management servers 30000 (hereafter referred to as a server ID) in the computer system and an IP address 34200 that is a field for storing an IF address that has been allocated to each of a plurality of management servers 30000 in the computer system.

Figure 29:
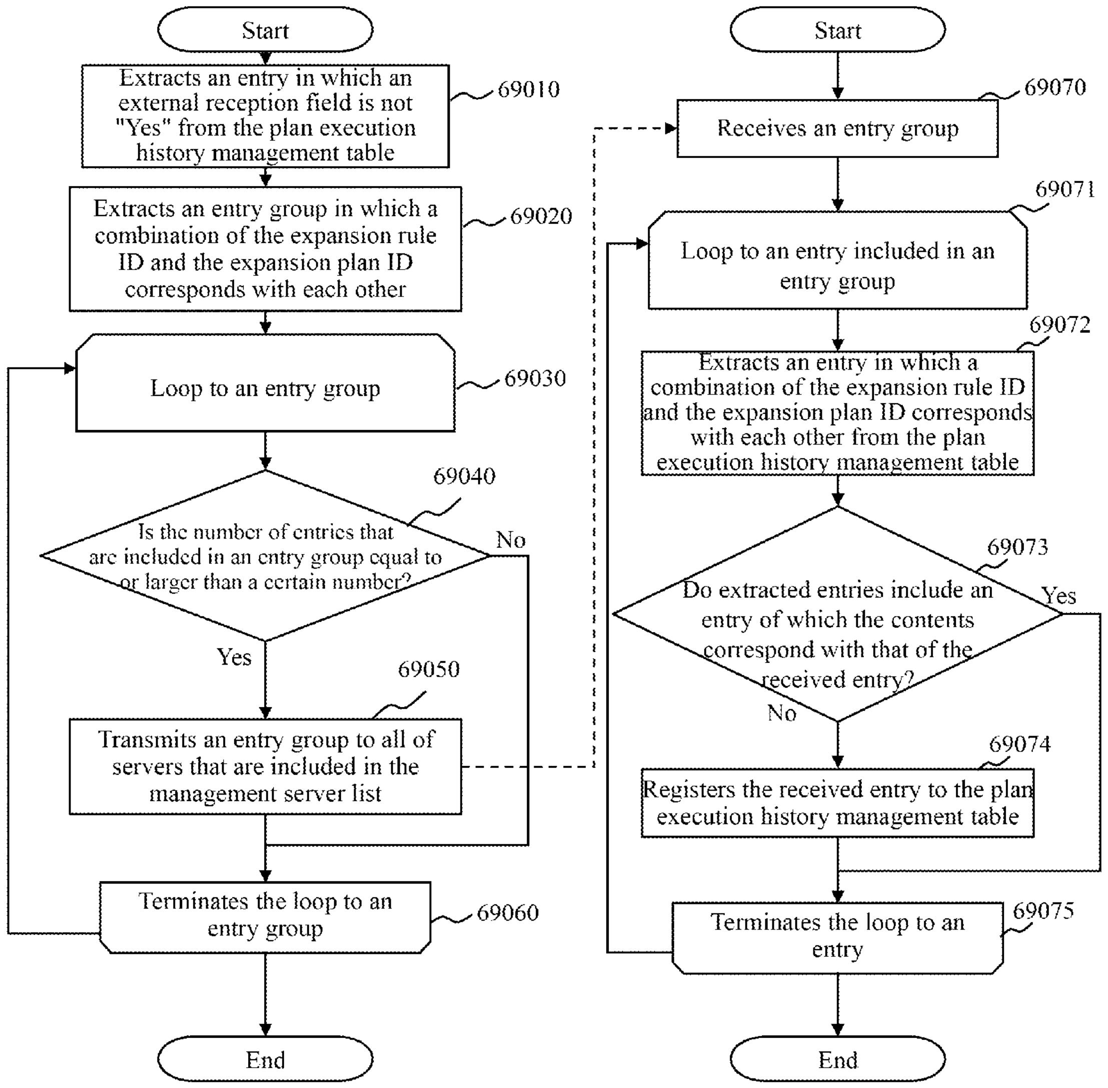
FIG. 29 is a flowchart of a plan execution history exchange processing in accordance with the third embodiment.

FIG. 29 is a flowchart of a plan execution history exchange processing in accordance with a third embodiment.

In FIG. 29, the processing from the step 69010 to the step 69060 is corresponded to the processing of the history transmitter and receiver module 32950 of the management server 30000 on a transmission side (hereafter referred to as a transmission side module), and the processing from the step 69070 to the step 69075 is corresponded to the processing of the history transmitter and receiver module 32950 of the management server 30000 on a reception side (hereafter referred to as a reception side module).

The transmission side module regularly or irregularly extracts one or more entries in which an external reception field 33995 is not "Yes" from the plan execution history management table 33950 of the management server 30000 on a transmission side (step 69010). The transmission side module then classifies one or more extracted entries into one or more entry groups (step 69020). Here, an entry group is one or more entries in which a combination of values of the expansion rule ID 33960 and the expansion plan ID 33970 corresponds with each other.

The transmission side module executes the processing from the step 69030 to the step 69060 to each of one or more entry groups.

In the step 69040, the transmission side module determines whether or not the number of entries that are included in an entry group of a processing target is equal to or larger than a certain number. In the case in which the number of entries that are included in an entry group of a processing target is equal to or larger than a certain number (step 69040: Yes), the transmission side module transmits data that includes all of data (history data) that is indicated by each entry of an entry group of a processing target (hereafter referred to as external history data) to all of other management servers 30000 that have been registered to the management server list 34210 (step 69050).

After terminating the processing from the step 69030 to the step 69060 to each of one or more entry groups, the transmission side module terminates the plan execution history exchange processing.

The reception side module of each management server 30000 that has received the external history data executes the processing from the step 69071 to the step 69075 to each entry that indicates history data included in the external history data.

In the first place, the reception side module extracts one or more entries in which a combination of values of the expansion rule ID 33960 and the expansion plan ID 33970 corresponds with each other from the plan execution history management table 33950 of the management server 30000 on a reception side (hereafter referred to as a reception side history management table) (step 69072).

In the next place, the reception side module determines whether or not one or more extracted entries include an entry in which a combination of a transmission source server 33997 and the execution date and time 33990 corresponds with that: of an entry of a processing target (step 69073). In the case in which an entry that corresponds with an entry of a processing target is not included (step (39073: No), the reception side module registers an entry of a processing target to the reception side history management table (step 69074). In this case, the external reception 33995 of an entry that is registered stores "Yes", and the transmission source server 33997 of an entry that is registered stores a server ID of the management server 30000 on a transmission side that is managed by the management server list 34200. On the other hand, in the case in which an entry that corresponds with an entry of a processing target is included (step 69073: Yes), the reception side module does not execute a registration of an entry of a processing target to the reception side history management table.

After terminating the processing from the step 69071 to the step 69075 to each entry that indicates history data included in the external history data, the reception side module terminates the plan execution history exchange processing.

In the case in which the management server 30000 in accordance with the present embodiment calculates a score value in the step 65070 of FIG. 19, the management server 30000 calculates a score value while also utilizing history data that has been registered to the plan execution history management table 33950 by the plan execution history exchange processing, that is, history data that has been received from the management server 30000 of other domain in addition to history data that has been obtained for a self-domain. The management server 30000 can also calculate a score value while handling history data that has been received from the management server 30000 of other domain similarly to history data that has been obtained for a self-domain, or can calculate a score value while distinguishing history data that has been received from the management server 30000 of other domain from history data that has been obtained for a self-domain. Moreover, it is also possible that the management server 30000 does not utilize history data that has been received from a specific management server 30000 of a plurality of management servers 30000 of other domain, such as a management server 30000 of a domain of a different operation form, for a calculation of a score value.

FIG. 30 is a block diagram showing an example of a plan presentation screen in accordance with a third embodiment.

A plan presentation screen in accordance with the third embodiment further displays data related to an execution history about the expansion plan for every expansion plan in a display area 71010 of a plan presentation screen in accordance with the first embodiment (FIG. 20). The data related to an execution history includes the total number of execution histories including an execution history that has been obtained for a self-domain and an execution history that has been received from the management server 30000 of other domain, the number of execution histories that have been received from the management server 30000 of other domain among the total number of execution histories, and the number of the management servers 30000 of other domain that have transmitted an execution history for instance. From data related to an execution history about the first expansion plan an expansion plan in which "#" is "1") for instance, it can be known that the expansion plan has been executed 100 times in total and has been executed 20 times in number for three other domains. The data related to an execution history can include the information that specifically indicates a domain of a management server 30000 in which the presented expansion plan has been executed for instance. FIG. 30 is an example of a plan presentation screen, and a display form is not restricted to one shown in FIG. 30 as long as a screen in which a manager can understand a degree of the breakdown of an execution history is adopted.

In accordance with the third embodiment, the management server 30000 scores an expansion plan while also utilizing history data that has been received from the management server 30000 of other domain in addition to history data that has been obtained for a self-domain. The management server 30000 determines whether or not automatic coping is possible depending on a certainty factor and a score value for a failure cause. In the case in which automatic coping is possible, the management server 30000 can carry out a failure recovery by automatically executing an expansion plan in which a score value is highest. The management server 30000 can obtain an approval of a manager before automatically executing an expansion plan. In the case in which automatic coping is impossible, the management server 30000 arranges and displays data that indicates a plurality of expansion plans to a failure cause in an order from an expansion plan with a higher score value and presents the data to as manager. By this configuration, the management server 30000 or a manager can rapidly select a suitable expansion plan depending on the past actual achievement based on a score value that has been calculated while utilizing not only history data that has been obtained for a self-domain but also history data that has been obtained for other domain, thereby reducing an operation management cost for a failure recovery.

The present invention is not restricted to the above embodiments that have been described above, and it is obvious that various changes and modifications can be thus made without departing from the scope of the present invention.

REFERENCE SIGNS LIST

10000: Host computer
20000: Storage apparatus
30000: Management server
35000: WEB browser start-up server
40000: IP switch
45000: Communication network

The invention claimed is:

1. A method for configuring a management system, the method comprising:

determining that an event has occurred in one of a plurality of management target devices;

executing a cause analysis of the event and specifying a first candidate cause event based on one or more rules, wherein the one or more rules indicate a correspondence relationship between a plurality of cause events and one or more condition events;

calculating a certainty factor indicating the certainty for the first candidate cause event being a true cause of the event;

specifying a plurality of first plans based on the first candidate cause event and the certainty factor, wherein each of the first plans includes a recovery measure that can be executed;

calculating, for each of the plurality of first plans, an index value indicating a possibility of succeeding in a failure recovery based on plan history information indicating success or failure of a particular recovery measure;

displaying displayed data indicating one or more plans of the plurality of first plans that have index values that are equal to or larger than a predetermined value;

arranging the displayed data in an order from largest to smallest index value; and if the certainty factor is equal to or larger than a threshold, executing a particular first plan having a largest index value among the plurality of first plans.

2. The method according to claim 1 further comprising:

specifying a second candidate cause event based on the one or more rules;

calculating the certainty factor for second candidate cause event;

specifying a plurality of second plans based on second first candidate cause event and the certainty factor for the second candidate cause event;

calculating, for each of the plurality of second plans, the index value; and if the certainty factor of the first candidate cause event is equal to or larger than a second threshold and a particular index value of a particular second plan from the plurality of second plans exceeds a third threshold, executing the particular second plan.

3. The method according to claim 1, further comprising:

after executing the particular first plan, adding data indicating the success or failure of the failure recovery to the plan history information.

4. The method according to claim 3, wherein the plan history information includes a plurality of history elements indicated by associating a rule including a cause event specified as a candidate of a cause in the past, a plan executed, and the success or failure of a failure recovery by an execution of the plan with each other, and wherein the method further comprises:

determining whether or not, for every combination of the one or more rules and corresponding plans, history elements related to the combination is equal to or larger than a predetermined number; and if a particular combination is less than the predetermined number, executing a test for a particular corresponding plan of the particular combination, wherein the test creates a new history element related to the combination and adds the new history element to the plan history information.

5. The method according to claim 4, wherein the method further comprises:

if a number of history elements related to the particular combination is equal to or larger than a history threshold, transmitting history data including a particular history element related to the combination to a different management system configured to manage a computer system different from the computer system; and receiving from the different management system, data and adding the particular history element to the plan history information.

6. The method according to claim 5, wherein the rule includes a general rule in which a particular management target device from the plurality of management target devices is related to the cause event and the condition events are represented by a type of the management target device and an expansion rule, and wherein the plan further includes a general plan that is independent of an actual configuration of the particular management target device and an expansion plan, wherein the expansion plan is by expanding the general plan in consideration of the actual configuration of the Particular management target device, and wherein the method further comprises:

creating a plurality of expansion rules based on connection information indicating a connection relations hip between the plurality of management target devices and the general rule;

specifying the first candidate cause event based on the certainty factor calculated for each cause event of the plurality of created expansion rules in the cause analysis of the event; and specifying a particular general plan corresponding to the general rule that is a basis of a particular expansion rule including the first candidate cause event based on the plan information and specifying each of a plurality of expansion plans created by expanding the particular general plan as the first plan.

7. A management system comprising:

a storage device; and a control device coupled to the storage device, the storage device being configured to store:

one or more rules indicating a correspondence relationship between a cause event related, to any one of a plurality of management target devices and one or more condition events related to any one of the plurality of management target devices that is a condition under which the cause event is a cause, plan information indicating a correspondence relationship between a particular rule and a particular plan, wherein each of the one or more rules includes a recovery measure, and plan history information that includes an indication of success or failure of a failure recovery, and wherein the control device:

determines that an event has occurred in one of the plurality of management target devices;

executes a cause analysis of the event and specifies a first candidate cause event based on the one or more rules;

calculates a certainty factor indicating the certainty for first candidate cause event being a true cause of the event;

specifies a plurality of first plans based on the first candidate cause event and the certainty factor;

calculates, for each of the plurality of first plans, an index value indicating a possibility of succeeding in the failure recovery based on the plan history information; and displays displayed data indicating one or more plans of the plurality of first plans that have index values that are equal to or larger than a predetermined value;

arranges the displayed data in an order from largest to smallest index value; and if the certainty factor is equal to or larger than a threshold, executes a particular first plan having a largest index value among the plurality of first plans.

8. The management system according to claim 7, wherein the plan history information includes a plurality of history elements indicated by associating a rule including a cause event specified as a candidate of a cause in the past, a plan, and success or failure of the failure recovery, and wherein the control device further:

determines whether or not, for every combination of the one or more rules and corresponding plans, history elements related to a particular combination is equal to or larger than a predetermined number; and if the particular combination is less than the predetermined number, executes a test for the particular plan, wherein the test creates a new history element and adds the new history element to the plan history information.

9. The management system according to claim 7, wherein the plan history information includes a plurality of history elements indicated by associating a rule including a cause event specified as a candidate of a cause in the past, a plan, and success or failure of the failure recovery, and wherein the control device further:

if a number of history elements related to a particular combination is equal to or larger than a history threshold, transmits history data including a particular history element related to the particular combination to a different management system configured to manage a computer system different from the computer system; and receives the history data from the different management system and adds the history element included in the history data to the plan history information.

10. The management system according to claim 7, wherein each of the one or more rules includes a general rule in which a particular management target device from the plurality of management target devices is related to the cause event and the condition events are represented by a type of the management target device, wherein the plan information indicates a correspondence relationship between the general rule and a general plan that is a recovery measure, wherein the recovery measure is independent of an actual configuration of the particular management target device, and wherein the storage device is further configured to store connection information indicating a connection relationship between the plurality of management target devices, and wherein the control device further:

creates a plurality of expansion rules based on the connection information and the general rule;

specifies the first candidate cause event based on the plurality of expansion rules; and specifies a particular general plan corresponding to the general rule that is a basis of particular expansion rule including the first cause event based on the plan information and specify each of a plurality of expansion plans created by expanding the particular general plan as the particular first plan.

* * * * *